(12) United States Patent
Bharadwaj

(10) Patent No.: US 10,254,991 B2
(45) Date of Patent: Apr. 9, 2019

(54) STORAGE AREA NETWORK BASED EXTENDED I/O METRICS COMPUTATION FOR DEEP INSIGHT INTO APPLICATION PERFORMANCE

(71) Applicant: CISCO TECHNOLOGY, INC., San Jose, CA (US)

(72) Inventor: Harsha Bharadwaj, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 14 days.

(21) Appl. No.: 15/451,139

(22) Filed: Mar. 6, 2017

(65) Prior Publication Data

US 2018/0253256 A1 Sep. 6, 2018

(51) Int. Cl.
*G06F 3/06* (2006.01)
*H04L 29/08* (2006.01)
*G06F 13/10* (2006.01)

(52) U.S. Cl.
CPC ............ *G06F 3/0644* (2013.01); *G06F 3/061* (2013.01); *G06F 3/067* (2013.01); *G06F 13/102* (2013.01); *H04L 67/1097* (2013.01)

(58) Field of Classification Search
CPC .......... G06F 3/061; G06F 3/067; G06F 3/102; G06F 3/0644; H04L 67/1097
See application file for complete search history.

(56) References Cited

U.S. PATENT DOCUMENTS 4,688,695 A 8/1987 Hirohata
5,263,003 A 11/1993 Cowles et al.
(Continued)

FOREIGN PATENT DOCUMENTS

EP 2228719 9/2010
EP 2439637 4/2012
(Continued)

OTHER PUBLICATIONS

Author Unknown, "5 Benefits of a Storage Gateway in the Cloud," Blog, TwinStrata, Inc., posted Jul. 10, 2012, 4 pages, https://web.archive.org/web/20120725092619/http://blog.twinstrata.com/2012/07/10//5-benefits-of-a-storage-gateway-in-the-cloud.
(Continued)

*Primary Examiner* — Nimesh G Patel
(74) *Attorney, Agent, or Firm* — Polsinelli PC

(57) ABSTRACT

A method is described and in one embodiment includes monitoring by an integrated circuit device READ/WRITE commands in connection with a flow of an application executing in a Fiber Channel Storage Area Network ("FC-SAN"); determining from the monitored READ/WRITE commands at least one metric for characterizing I/O performance of the application with respect to a storage device, wherein the at least one metric includes at least one of an inter I/O gap ("IIG"), a Logical Unit Number ("LUN") I/O access pattern ("IAP"), relative block size, I/O operations per second ("IOPS") and throughput, and IOPS per virtual server; storing the calculated at least one metric in a flow record associated with the flow; and using the calculated at least one metric to identify a storage device for use by the flow, wherein the calculated at least one metric is indicative of a performance of the application in the FC-SAN.

18 Claims, 12 Drawing Sheets

(56) References Cited

U.S. PATENT DOCUMENTS

| | | |
|---|---|---|
| 5,339,445 A | 8/1994 | Gasztonyi |
| 5,430,859 A | 7/1995 | Norman et al. |
| 5,457,746 A | 10/1995 | Dolphin |
| 5,535,336 A | 7/1996 | Smith et al. |
| 5,588,012 A | 12/1996 | Oizumi |
| 5,617,421 A | 4/1997 | Chin et al. |
| 5,680,579 A | 10/1997 | Young et al. |
| 5,690,194 A | 11/1997 | Parker et al. |
| 5,740,171 A | 4/1998 | Mazzola et al. |
| 5,742,604 A | 4/1998 | Edsall et al. |
| 5,764,636 A | 6/1998 | Edsall |
| 5,809,285 A | 9/1998 | Hilland |
| 5,812,814 A | 9/1998 | Sukegawa |
| 5,812,950 A | 9/1998 | Tom |
| 5,838,970 A | 11/1998 | Thomas |
| 5,999,930 A | 12/1999 | Wolff |
| 6,035,105 A | 3/2000 | McCloghrie et al. |
| 6,043,777 A | 3/2000 | Bergman et al. |
| 6,101,497 A | 8/2000 | Ofek |
| 6,148,414 A | 11/2000 | Brown et al. |
| 6,185,203 B1 | 2/2001 | Berman |
| 6,188,694 B1 | 2/2001 | Fine et al. |
| 6,202,135 B1 | 3/2001 | Kedem et al. |
| 6,208,649 B1 | 3/2001 | Kloth |
| 6,209,059 B1 | 3/2001 | Ofer et al. |
| 6,219,699 B1 | 4/2001 | McCloghrie et al. |
| 6,219,753 B1 | 4/2001 | Richardson |
| 6,223,250 B1 | 4/2001 | Yokono |
| 6,226,771 B1 | 5/2001 | Hilla et al. |
| 6,260,120 B1 | 7/2001 | Blumenau et al. |
| 6,266,705 B1 | 7/2001 | Ullum et al. |
| 6,269,381 B1 | 7/2001 | St. Pierre et al. |
| 6,269,431 B1 | 7/2001 | Dunham |
| 6,295,575 B1 | 9/2001 | Blumenau et al. |
| 6,400,730 B1 | 6/2002 | Latif et al. |
| 6,408,406 B1 | 6/2002 | Parris |
| 6,542,909 B1 | 4/2003 | Tamer et al. |
| 6,542,961 B1 | 4/2003 | Matsunami et al. |
| 6,553,390 B1 | 4/2003 | Gross et al. |
| 6,564,252 B1 | 5/2003 | Hickman et al. |
| 6,647,474 B2 | 11/2003 | Yanai et al. |
| 6,675,258 B1 | 1/2004 | Bramhall et al. |
| 6,683,883 B1 | 1/2004 | Czeiger et al. |
| 6,694,413 B1 | 2/2004 | Mimatsu et al. |
| 6,708,227 B1 | 3/2004 | Cabrera et al. |
| 6,715,007 B1 | 3/2004 | Williams et al. |
| 6,728,791 B1 | 4/2004 | Young |
| 6,772,231 B2 | 8/2004 | Reuter et al. |
| 6,820,099 B1 | 11/2004 | Huber et al. |
| 6,847,647 B1 | 1/2005 | Wrenn |
| 6,848,759 B2 | 2/2005 | Doornbos et al. |
| 6,850,955 B2 | 2/2005 | Sonoda et al. |
| 6,876,656 B2 | 4/2005 | Brewer et al. |
| 6,880,062 B1 | 4/2005 | Ibrahim et al. |
| 6,898,670 B2 | 5/2005 | Nahum |
| 6,907,419 B1 | 6/2005 | Pesola et al. |
| 6,912,668 B1 | 6/2005 | Brown et al. |
| 6,952,734 B1 | 10/2005 | Gunlock et al. |
| 6,976,090 B2 | 12/2005 | Ben-Shaul et al. |
| 6,978,300 B1 | 12/2005 | Beukema et al. |
| 6,983,303 B2 | 1/2006 | Pellegrino et al. |
| 6,986,015 B2 | 1/2006 | Testardi |
| 6,986,069 B2 | 1/2006 | Oehler et al. |
| 7,051,056 B2 | 5/2006 | Rodriguez-Rivera et al. |
| 7,069,465 B2 | 6/2006 | Chu et al. |
| 7,073,017 B2 | 7/2006 | Yamamoto |
| 7,108,339 B2 | 9/2006 | Berger |
| 7,149,858 B2 | 12/2006 | Kiselev |
| 7,171,514 B2 | 1/2007 | Coronado et al. |
| 7,171,668 B2 | 1/2007 | Molloy et al. |
| 7,174,354 B2 | 2/2007 | Andreasson |
| 7,200,144 B2 | 4/2007 | Terrell et al. |
| 7,222,255 B1 | 5/2007 | Claessens et al. |
| 7,237,045 B2 | 6/2007 | Beckmann et al. |
| 7,240,188 B2 | 7/2007 | Takata et al. |
| 7,246,260 B2 | 7/2007 | Brown et al. |
| 7,266,718 B2 | 9/2007 | Idei et al. |
| 7,269,168 B2 | 9/2007 | Roy et al. |
| 7,277,431 B2 | 10/2007 | Walter et al. |
| 7,277,948 B2 | 10/2007 | Igarashi et al. |
| 7,305,658 B1 | 12/2007 | Hamilton et al. |
| 7,328,434 B2 | 2/2008 | Swanson et al. |
| 7,340,555 B2 | 3/2008 | Ashmore et al. |
| 7,346,751 B2 | 3/2008 | Prahlad et al. |
| 7,352,706 B2 | 4/2008 | Klotz et al. |
| 7,353,305 B2 | 4/2008 | Pangal et al. |
| 7,359,321 B1 | 4/2008 | Sindhu et al. |
| 7,383,381 B1 | 6/2008 | Faulkner et al. |
| 7,403,987 B1 * | 7/2008 | Marinelli ............ H04L 43/0817 707/999.202 |
| 7,433,326 B2 | 10/2008 | Desai et al. |
| 7,433,948 B2 | 10/2008 | Edsall |
| 7,434,105 B1 | 10/2008 | Rodriguez-Rivera et al. |
| 7,441,154 B2 | 10/2008 | Klotz et al. |
| 7,447,839 B2 | 11/2008 | Uppala |
| 7,487,321 B2 | 2/2009 | Muthiah et al. |
| 7,500,053 B1 | 3/2009 | Kavuri et al. |
| 7,512,744 B2 | 3/2009 | Banga et al. |
| 7,542,681 B2 | 6/2009 | Cornell et al. |
| 7,558,872 B1 | 7/2009 | Senevirathne et al. |
| 7,587,570 B2 | 9/2009 | Sarkar et al. |
| 7,631,023 B1 * | 12/2009 | Kaiser ................. G06F 3/061 |
| 7,643,505 B1 | 1/2010 | Colloff |
| 7,654,625 B2 | 2/2010 | Amann et al. |
| 7,657,796 B1 | 2/2010 | Kaiser et al. |
| 7,668,981 B1 | 2/2010 | Nagineni et al. |
| 7,669,071 B2 | 2/2010 | Cochran et al. |
| 7,689,384 B1 | 3/2010 | Becker |
| 7,694,092 B2 | 4/2010 | Mizuno |
| 7,697,554 B1 | 4/2010 | Ofer et al. |
| 7,706,303 B2 | 4/2010 | Bose et al. |
| 7,707,481 B2 | 4/2010 | Kirschner et al. |
| 7,716,648 B2 | 5/2010 | Vaidyanathan et al. |
| 7,752,360 B2 | 7/2010 | Galles |
| 7,757,059 B1 | 7/2010 | Ofer et al. |
| 7,774,329 B1 | 8/2010 | Peddy et al. |
| 7,774,839 B2 | 8/2010 | Nazzal |
| 7,793,138 B2 | 9/2010 | Rastogi et al. |
| 7,840,730 B2 | 11/2010 | D'Amato et al. |
| 7,843,906 B1 | 11/2010 | Chidambaram et al. |
| 7,895,428 B2 | 2/2011 | Boland, IV et al. |
| 7,904,599 B1 | 3/2011 | Bennett |
| 7,930,494 B1 | 4/2011 | Goheer et al. |
| 7,975,175 B2 | 7/2011 | Votta et al. |
| 7,979,670 B2 | 7/2011 | Saliba et al. |
| 7,984,259 B1 | 7/2011 | English |
| 8,031,703 B2 | 10/2011 | Gottumukkula et al. |
| 8,032,621 B1 | 10/2011 | Upalekar et al. |
| 8,051,197 B2 | 11/2011 | Mullendore et al. |
| 8,086,755 B2 | 12/2011 | Duffy, IV et al. |
| 8,161,134 B2 | 4/2012 | Mishra et al. |
| 8,196,018 B2 | 6/2012 | Forhan et al. |
| 8,205,951 B2 | 6/2012 | Boks |
| 8,218,538 B1 | 7/2012 | Chidambaram et al. |
| 8,230,066 B2 | 7/2012 | Heil |
| 8,234,377 B2 | 7/2012 | Cohn |
| 8,266,238 B2 | 9/2012 | Zimmer et al. |
| 8,272,104 B2 | 9/2012 | Chen et al. |
| 8,274,993 B2 | 9/2012 | Sharma et al. |
| 8,290,919 B1 | 10/2012 | Kelly et al. |
| 8,297,722 B2 | 10/2012 | Chambers et al. |
| 8,301,746 B2 | 10/2012 | Head et al. |
| 8,335,231 B2 | 12/2012 | Kloth et al. |
| 8,341,121 B1 | 12/2012 | Claudatos et al. |
| 8,345,692 B2 | 1/2013 | Smith |
| 8,352,941 B1 | 1/2013 | Protopopov et al. |
| 8,392,760 B2 | 3/2013 | Kandula et al. |
| 8,442,059 B1 | 5/2013 | de la Iglesia et al. |
| 8,479,211 B1 | 7/2013 | Marshall et al. |
| 8,495,356 B2 | 7/2013 | Ashok et al. |
| 8,514,868 B2 | 8/2013 | Hill |
| 8,532,108 B2 | 9/2013 | Li et al. |
| 8,560,663 B2 | 10/2013 | Baucke et al. |
| 8,619,599 B1 | 12/2013 | Even |

(56) References Cited

U.S. PATENT DOCUMENTS

| | | | |
|---|---|---|---|
| 8,626,891 B2 | 1/2014 | Guru et al. |
| 8,630,983 B2 | 1/2014 | Sengupta et al. |
| 8,660,129 B1 | 2/2014 | Brendel et al. |
| 8,661,299 B1 | 2/2014 | Ip |
| 8,677,485 B2 | 3/2014 | Sharma et al. |
| 8,683,296 B2 | 3/2014 | Anderson et al. |
| 8,706,772 B2 | 4/2014 | Hartig et al. |
| 8,719,804 B2 | 5/2014 | Jain |
| 8,725,854 B2 | 5/2014 | Edsall |
| 8,768,981 B1 | 7/2014 | Milne et al. |
| 8,775,773 B2 | 7/2014 | Acharya et al. |
| 8,793,372 B2 | 7/2014 | Ashok et al. |
| 8,805,918 B1 | 8/2014 | Chandrasekaran et al. |
| 8,805,951 B1 | 8/2014 | Faibish et al. |
| 8,832,330 B1 | 9/2014 | Lancaster |
| 8,855,116 B2 | 10/2014 | Rosset et al. |
| 8,856,339 B2 | 10/2014 | Mestery et al. |
| 8,868,474 B2 | 10/2014 | Leung et al. |
| 8,887,286 B2 | 11/2014 | Dupont et al. |
| 8,898,385 B2 | 11/2014 | Jayaraman et al. |
| 8,909,928 B2 | 12/2014 | Ahmad et al. |
| 8,918,510 B2 | 12/2014 | Gmach et al. |
| 8,918,586 B1 | 12/2014 | Todd et al. |
| 8,924,720 B2 | 12/2014 | Raghuram et al. |
| 8,930,747 B2 | 1/2015 | Levijarvi et al. |
| 8,935,500 B1 | 1/2015 | Gulati et al. |
| 8,949,677 B1 | 2/2015 | Brundage et al. |
| 8,996,837 B1 | 3/2015 | Bono et al. |
| 9,003,086 B1 | 4/2015 | Schuller et al. |
| 9,007,922 B1 | 4/2015 | Mittal et al. |
| 9,009,427 B2 | 4/2015 | Sharma et al. |
| 9,009,704 B2 | 4/2015 | McGrath et al. |
| 9,075,638 B2 | 7/2015 | Barnett et al. |
| 9,141,554 B1 | 9/2015 | Candelaria |
| 9,141,785 B2 | 9/2015 | Mukkara et al. |
| 9,164,795 B1 | 10/2015 | Vincent |
| 9,176,677 B1 | 11/2015 | Fradkin et al. |
| 9,201,704 B2 | 12/2015 | Chang et al. |
| 9,203,784 B2 | 12/2015 | Chang et al. |
| 9,207,882 B2 | 12/2015 | Rosset et al. |
| 9,207,929 B2 | 12/2015 | Katsura |
| 9,213,612 B2 | 12/2015 | Candelaria |
| 9,223,564 B2 | 12/2015 | Munireddy et al. |
| 9,223,634 B2 | 12/2015 | Chang et al. |
| 9,244,761 B2 | 1/2016 | Yekhanin et al. |
| 9,250,969 B2 | 2/2016 | Lagar-Cavilla et al. |
| 9,264,494 B2 | 2/2016 | Factor et al. |
| 9,270,754 B2 | 2/2016 | Iyengar et al. |
| 9,280,487 B2 | 3/2016 | Candelaria |
| 9,304,815 B1 | 4/2016 | Vasanth et al. |
| 9,313,048 B2 | 4/2016 | Chang et al. |
| 9,374,270 B2 | 6/2016 | Nakil et al. |
| 9,378,060 B2 | 6/2016 | Jansson et al. |
| 9,396,251 B1 | 7/2016 | Boudreau et al. |
| 9,448,877 B2 | 9/2016 | Candelaria |
| 9,471,348 B2 | 10/2016 | Zuo et al. |
| 9,501,473 B1 | 11/2016 | Kong et al. |
| 9,503,523 B2 | 11/2016 | Rosset et al. |
| 9,565,110 B2 | 2/2017 | Mullendore et al. |
| 9,575,828 B2 | 2/2017 | Agarwal et al. |
| 9,582,377 B1 | 2/2017 | Dhoolam et al. |
| 9,614,763 B2 | 4/2017 | Dong et al. |
| 9,658,868 B2 | 5/2017 | Hill |
| 9,658,876 B2 | 5/2017 | Chang et al. |
| 9,733,868 B2 | 8/2017 | Chandrasekaran et al. |
| 9,763,518 B2 | 9/2017 | Charest et al. |
| 9,830,240 B2 | 11/2017 | George et al. |
| 9,853,873 B2 | 12/2017 | Dasu et al. |
| 2002/0049980 A1 | 4/2002 | Hoang |
| 2002/0053009 A1 | 5/2002 | Selkirk et al. |
| 2002/0073276 A1 | 6/2002 | Howard et al. |
| 2002/0083120 A1 | 6/2002 | Soltis |
| 2002/0095547 A1 | 7/2002 | Watanabe et al. |
| 2002/0103889 A1 | 8/2002 | Markson et al. |
| 2002/0103943 A1 | 8/2002 | Lo et al. |
| 2002/0112113 A1 | 8/2002 | Karpoff et al. |
| 2002/0120741 A1 | 8/2002 | Webb et al. |
| 2002/0138675 A1 | 9/2002 | Mann |
| 2002/0156971 A1 | 10/2002 | Jones et al. |
| 2003/0023885 A1 | 1/2003 | Potter et al. |
| 2003/0026267 A1 | 2/2003 | Oberman et al. |
| 2003/0055933 A1 | 3/2003 | Ishizaki et al. |
| 2003/0056126 A1 | 3/2003 | O'Connor et al. |
| 2003/0065986 A1 | 4/2003 | Fraenkel et al. |
| 2003/0084359 A1 | 5/2003 | Bresniker et al. |
| 2003/0118053 A1 | 6/2003 | Edsall et al. |
| 2003/0131105 A1 | 7/2003 | Czeiger et al. |
| 2003/0131165 A1 | 7/2003 | Asano et al. |
| 2003/0131182 A1 | 7/2003 | Kumar et al. |
| 2003/0140134 A1 | 7/2003 | Swanson et al. |
| 2003/0140210 A1 | 7/2003 | Testardi |
| 2003/0149763 A1 | 8/2003 | Heitman et al. |
| 2003/0154271 A1 | 8/2003 | Baldwin et al. |
| 2003/0159058 A1 | 8/2003 | Eguchi et al. |
| 2003/0174725 A1 | 9/2003 | Shankar |
| 2003/0189395 A1 | 10/2003 | Doornbos et al. |
| 2003/0210686 A1 | 11/2003 | Terrell et al. |
| 2004/0024961 A1 | 2/2004 | Cochran et al. |
| 2004/0030857 A1 | 2/2004 | Krakirian et al. |
| 2004/0039939 A1 | 2/2004 | Cox et al. |
| 2004/0054776 A1 | 3/2004 | Klotz et al. |
| 2004/0057389 A1 | 3/2004 | Klotz et al. |
| 2004/0059807 A1 | 3/2004 | Klotz et al. |
| 2004/0088574 A1 | 5/2004 | Walter et al. |
| 2004/0117438 A1 | 6/2004 | Considine et al. |
| 2004/0123029 A1 | 6/2004 | Dalai et al. |
| 2004/0128470 A1 | 7/2004 | Hetzler et al. |
| 2004/0128540 A1 | 7/2004 | Roskind |
| 2004/0153863 A1 | 8/2004 | Klotz et al. |
| 2004/0190901 A1 | 9/2004 | Fang |
| 2004/0215749 A1 | 10/2004 | Tsao |
| 2004/0230848 A1 | 11/2004 | Mayo et al. |
| 2004/0250034 A1 | 12/2004 | Yagawa et al. |
| 2005/0033936 A1 | 2/2005 | Nakano et al. |
| 2005/0036499 A1 | 2/2005 | Dutt et al. |
| 2005/0050211 A1 | 3/2005 | Kaul et al. |
| 2005/0050270 A1 | 3/2005 | Horn et al. |
| 2005/0053073 A1 | 3/2005 | Kloth et al. |
| 2005/0055428 A1 | 3/2005 | Terai et al. |
| 2005/0060574 A1 | 3/2005 | Klotz et al. |
| 2005/0060598 A1 | 3/2005 | Klotz et al. |
| 2005/0071851 A1 | 3/2005 | Opheim |
| 2005/0076113 A1 | 4/2005 | Klotz et al. |
| 2005/0091426 A1 | 4/2005 | Horn et al. |
| 2005/0114611 A1* | 5/2005 | Durham ............ G06F 17/30067 711/154 |
| 2005/0114615 A1 | 5/2005 | Ogasawara et al. |
| 2005/0117522 A1 | 6/2005 | Basavaiah et al. |
| 2005/0117562 A1 | 6/2005 | Wrenn |
| 2005/0138287 A1 | 6/2005 | Ogasawara et al. |
| 2005/0169188 A1 | 8/2005 | Cometto et al. |
| 2005/0185597 A1 | 8/2005 | Le et al. |
| 2005/0188170 A1 | 8/2005 | Yamamoto |
| 2005/0198523 A1 | 9/2005 | Shanbhag et al. |
| 2005/0235072 A1 | 10/2005 | Smith et al. |
| 2005/0283658 A1 | 12/2005 | Clark et al. |
| 2006/0015861 A1 | 1/2006 | Takata et al. |
| 2006/0015928 A1 | 1/2006 | Setty et al. |
| 2006/0034302 A1 | 2/2006 | Peterson |
| 2006/0045021 A1 | 3/2006 | Deragon et al. |
| 2006/0075191 A1 | 4/2006 | Lolayekar et al. |
| 2006/0098672 A1 | 5/2006 | Schzukin et al. |
| 2006/0117099 A1 | 6/2006 | Mogul |
| 2006/0136684 A1 | 6/2006 | Le et al. |
| 2006/0184287 A1 | 8/2006 | Belady et al. |
| 2006/0198319 A1 | 9/2006 | Schondelmayer et al. |
| 2006/0215297 A1 | 9/2006 | Kikuchi |
| 2006/0230227 A1 | 10/2006 | Ogasawara et al. |
| 2006/0242332 A1 | 10/2006 | Johnsen et al. |
| 2006/0251111 A1 | 11/2006 | Kloth et al. |
| 2007/0005297 A1 | 1/2007 | Beresniewicz et al. |
| 2007/0067593 A1 | 3/2007 | Satoyama et al. |
| 2007/0079068 A1 | 4/2007 | Draggon |
| 2007/0091903 A1 | 4/2007 | Atkinson |

(56) References Cited

U.S. PATENT DOCUMENTS

| | | |
|---|---|---|
| 2007/0094465 A1 | 4/2007 | Sharma et al. |
| 2007/0101202 A1 | 5/2007 | Garbow |
| 2007/0121519 A1 | 5/2007 | Cuni et al. |
| 2007/0136541 A1 | 6/2007 | Herz et al. |
| 2007/0162969 A1 | 7/2007 | Becker |
| 2007/0211640 A1 | 9/2007 | Palacharla et al. |
| 2007/0214316 A1 | 9/2007 | Kim |
| 2007/0250838 A1 | 10/2007 | Belady et al. |
| 2007/0258380 A1 | 11/2007 | Chamdani et al. |
| 2007/0263545 A1 | 11/2007 | Foster et al. |
| 2007/0276884 A1 | 11/2007 | Hara et al. |
| 2007/0283059 A1 | 12/2007 | Ho et al. |
| 2008/0016412 A1 | 1/2008 | White et al. |
| 2008/0034149 A1 | 2/2008 | Sheen |
| 2008/0052459 A1 | 2/2008 | Chang et al. |
| 2008/0059698 A1 | 3/2008 | Kabir et al. |
| 2008/0114933 A1 | 5/2008 | Ogasawara et al. |
| 2008/0126509 A1 | 5/2008 | Subrannanian et al. |
| 2008/0126734 A1 | 5/2008 | Murase |
| 2008/0168304 A1 | 7/2008 | Flynn et al. |
| 2008/0201616 A1 | 8/2008 | Ashmore |
| 2008/0244184 A1 | 10/2008 | Lewis et al. |
| 2008/0256082 A1 | 10/2008 | Davies et al. |
| 2008/0267217 A1 | 10/2008 | Colville et al. |
| 2008/0288661 A1 | 11/2008 | Galles |
| 2008/0294888 A1 | 11/2008 | Ando et al. |
| 2009/0063766 A1 | 3/2009 | Matsumura et al. |
| 2009/0083484 A1 | 3/2009 | Basham et al. |
| 2009/0089567 A1 | 4/2009 | Boland, IV et al. |
| 2009/0094380 A1 | 4/2009 | Qiu et al. |
| 2009/0094664 A1 | 4/2009 | Butler et al. |
| 2009/0125694 A1 | 5/2009 | Innan et al. |
| 2009/0193223 A1 | 7/2009 | Saliba et al. |
| 2009/0201926 A1 | 8/2009 | Kagan et al. |
| 2009/0222733 A1 | 9/2009 | Basham et al. |
| 2009/0240873 A1 | 9/2009 | Yu et al. |
| 2009/0282471 A1 | 11/2009 | Green et al. |
| 2009/0323706 A1 | 12/2009 | Germain et al. |
| 2010/0011365 A1 | 1/2010 | Gerovac et al. |
| 2010/0030995 A1 | 2/2010 | Wang et al. |
| 2010/0046378 A1 | 2/2010 | Knapp et al. |
| 2010/0083055 A1 | 4/2010 | Ozonat |
| 2010/0174968 A1 | 7/2010 | Charles et al. |
| 2010/0318609 A1 | 12/2010 | Lahiri et al. |
| 2010/0318837 A1 | 12/2010 | Murphy et al. |
| 2011/0010394 A1 | 1/2011 | Carew et al. |
| 2011/0022691 A1 | 1/2011 | Banerjee et al. |
| 2011/0029824 A1 | 2/2011 | Schöler et al. |
| 2011/0035494 A1 | 2/2011 | Pandey et al. |
| 2011/0075667 A1 | 3/2011 | Li et al. |
| 2011/0087848 A1 | 4/2011 | Trent |
| 2011/0119556 A1 | 5/2011 | de Buen |
| 2011/0142053 A1 | 6/2011 | Van Der Merwe et al. |
| 2011/0161496 A1 | 6/2011 | Nicklin |
| 2011/0173303 A1 | 7/2011 | Rider |
| 2011/0228679 A1 | 9/2011 | Varma et al. |
| 2011/0231899 A1 | 9/2011 | Pulier et al. |
| 2011/0239039 A1 | 9/2011 | Dieffenbach et al. |
| 2011/0252274 A1 | 10/2011 | Kawaguchi et al. |
| 2011/0255540 A1 | 10/2011 | Mizrahi et al. |
| 2011/0276584 A1 | 11/2011 | Cotner et al. |
| 2011/0276675 A1 | 11/2011 | Singh et al. |
| 2011/0276951 A1 | 11/2011 | Jain |
| 2011/0299539 A1 | 12/2011 | Rajagopal et al. |
| 2011/0307450 A1 | 12/2011 | Hahn et al. |
| 2011/0313973 A1 | 12/2011 | Srivas et al. |
| 2012/0023319 A1 | 1/2012 | Chin et al. |
| 2012/0030401 A1 | 2/2012 | Cowan et al. |
| 2012/0054367 A1 | 3/2012 | Ramakrishnan et al. |
| 2012/0072578 A1 | 3/2012 | Alam |
| 2012/0072985 A1 | 3/2012 | Davne et al. |
| 2012/0075999 A1 | 3/2012 | Ko et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0130874 A1 | 5/2012 | Mane et al. |
| 2012/0131174 A1 | 5/2012 | Ferris et al. |
| 2012/0134672 A1 | 5/2012 | Banerjee |
| 2012/0144014 A1 | 6/2012 | Natham et al. |
| 2012/0159112 A1* | 6/2012 | Tokusho ............... G06F 3/0611 711/171 |
| 2012/0167094 A1 | 6/2012 | Suit |
| 2012/0173581 A1 | 7/2012 | Hartig et al. |
| 2012/0173589 A1 | 7/2012 | Kwon et al. |
| 2012/0177039 A1 | 7/2012 | Berman |
| 2012/0177041 A1 | 7/2012 | Berman |
| 2012/0177042 A1 | 7/2012 | Berman |
| 2012/0177043 A1 | 7/2012 | Berman |
| 2012/0177044 A1 | 7/2012 | Berman |
| 2012/0177045 A1 | 7/2012 | Berman |
| 2012/0177370 A1 | 7/2012 | Berman |
| 2012/0179909 A1 | 7/2012 | Sagi et al. |
| 2012/0201138 A1 | 8/2012 | Yu et al. |
| 2012/0210041 A1 | 8/2012 | Flynn et al. |
| 2012/0254440 A1 | 10/2012 | Wang |
| 2012/0257501 A1 | 10/2012 | Kucharczyk |
| 2012/0265976 A1 | 10/2012 | Spiers et al. |
| 2012/0281706 A1 | 11/2012 | Agarwal et al. |
| 2012/0297088 A1 | 11/2012 | Wang et al. |
| 2012/0303618 A1 | 11/2012 | Dutta et al. |
| 2012/0311106 A1 | 12/2012 | Morgan |
| 2012/0311568 A1 | 12/2012 | Jansen |
| 2012/0320788 A1 | 12/2012 | Venkataramanan et al. |
| 2012/0324114 A1 | 12/2012 | Dutta et al. |
| 2012/0331119 A1 | 12/2012 | Bose et al. |
| 2013/0003737 A1 | 1/2013 | Sinicrope |
| 2013/0013664 A1 | 1/2013 | Baird et al. |
| 2013/0028135 A1 | 1/2013 | Berman |
| 2013/0036212 A1 | 2/2013 | Jibbe et al. |
| 2013/0036213 A1 | 2/2013 | Hasan et al. |
| 2013/0036449 A1 | 2/2013 | Mukkara et al. |
| 2013/0054888 A1 | 2/2013 | Bhat et al. |
| 2013/0061089 A1 | 3/2013 | Valiyaparambil et al. |
| 2013/0067162 A1 | 3/2013 | Jayaraman et al. |
| 2013/0080823 A1 | 3/2013 | Roth et al. |
| 2013/0086340 A1 | 4/2013 | Fleming et al. |
| 2013/0100858 A1 | 4/2013 | Kamath et al. |
| 2013/0111540 A1 | 5/2013 | Sabin |
| 2013/0138816 A1 | 5/2013 | Kuo et al. |
| 2013/0138836 A1 | 5/2013 | Cohen et al. |
| 2013/0139138 A1 | 5/2013 | Kakos |
| 2013/0144933 A1 | 6/2013 | Hinni et al. |
| 2013/0152076 A1 | 6/2013 | Patel |
| 2013/0152175 A1 | 6/2013 | Hromoko et al. |
| 2013/0163426 A1 | 6/2013 | Beliveau et al. |
| 2013/0163606 A1 | 6/2013 | Bagepalli et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198730 A1 | 8/2013 | Munireddy et al. |
| 2013/0208888 A1 | 8/2013 | Agrawal et al. |
| 2013/0212130 A1 | 8/2013 | Rahnama |
| 2013/0223236 A1 | 8/2013 | Dickey |
| 2013/0238641 A1 | 9/2013 | Mandelstein et al. |
| 2013/0266307 A1 | 10/2013 | Garg et al. |
| 2013/0268922 A1 | 10/2013 | Tiwari et al. |
| 2013/0275470 A1 | 10/2013 | Cao et al. |
| 2013/0297655 A1 | 11/2013 | Narasayya et al. |
| 2013/0297769 A1 | 11/2013 | Chang et al. |
| 2013/0318134 A1 | 11/2013 | Bolik et al. |
| 2013/0318288 A1 | 11/2013 | Khan et al. |
| 2014/0006708 A1 | 1/2014 | Huynh et al. |
| 2014/0016493 A1 | 1/2014 | Johnsson et al. |
| 2014/0019684 A1 | 1/2014 | Wei et al. |
| 2014/0025770 A1 | 1/2014 | Warfield et al. |
| 2014/0029441 A1 | 1/2014 | Nydell |
| 2014/0029442 A1 | 1/2014 | Wallman |
| 2014/0039683 A1 | 2/2014 | Zimmermann et al. |
| 2014/0040473 A1 | 2/2014 | Ho et al. |
| 2014/0040883 A1 | 2/2014 | Tompkins |
| 2014/0047201 A1 | 2/2014 | Mehta |
| 2014/0053264 A1 | 2/2014 | Dubrovsky et al. |
| 2014/0059187 A1 | 2/2014 | Rosset et al. |

(56) References Cited

U.S. PATENT DOCUMENTS

| | | |
|---|---|---|
| 2014/0059266 A1 | 2/2014 | Ben-Michael et al. |
| 2014/0086253 A1 | 3/2014 | Yong |
| 2014/0089273 A1 | 3/2014 | Borshack et al. |
| 2014/0095556 A1 | 4/2014 | Lee et al. |
| 2014/0096249 A1 | 4/2014 | Dupont et al. |
| 2014/0105009 A1 | 4/2014 | Vos et al. |
| 2014/0108474 A1 | 4/2014 | David et al. |
| 2014/0109071 A1 | 4/2014 | Ding et al. |
| 2014/0112122 A1 | 4/2014 | Kapadia et al. |
| 2014/0123207 A1 | 5/2014 | Agarwal et al. |
| 2014/0156557 A1 | 6/2014 | Zeng et al. |
| 2014/0164666 A1 | 6/2014 | Yand |
| 2014/0164866 A1 | 6/2014 | Bolotov et al. |
| 2014/0172371 A1 | 6/2014 | Zhu et al. |
| 2014/0173060 A1 | 6/2014 | Jubran et al. |
| 2014/0173195 A1 | 6/2014 | Rosset et al. |
| 2014/0173579 A1 | 6/2014 | McDonald et al. |
| 2014/0189278 A1 | 7/2014 | Peng |
| 2014/0198794 A1 | 7/2014 | Mehta et al. |
| 2014/0211661 A1 | 7/2014 | Gorkemli et al. |
| 2014/0215265 A1 | 7/2014 | Mohanta et al. |
| 2014/0215590 A1 | 7/2014 | Brand |
| 2014/0219086 A1 | 8/2014 | Cantu' et al. |
| 2014/0222953 A1 | 8/2014 | Karve et al. |
| 2014/0229790 A1 | 8/2014 | Goss et al. |
| 2014/0244585 A1 | 8/2014 | Sivasubramanian et al. |
| 2014/0244897 A1 | 8/2014 | Goss et al. |
| 2014/0245435 A1 | 8/2014 | Belenky |
| 2014/0269390 A1 | 9/2014 | Ciodaru et al. |
| 2014/0281700 A1 | 9/2014 | Nagesharao et al. |
| 2014/0297941 A1 | 10/2014 | Rajani et al. |
| 2014/0307578 A1 | 10/2014 | DeSanti |
| 2014/0317206 A1 | 10/2014 | Lomelino et al. |
| 2014/0324862 A1 | 10/2014 | Bingham et al. |
| 2014/0325208 A1 | 10/2014 | Resch et al. |
| 2014/0331276 A1 | 11/2014 | Frascadore et al. |
| 2014/0348166 A1 | 11/2014 | Yang et al. |
| 2014/0355450 A1 | 12/2014 | Bhikkaji et al. |
| 2014/0366155 A1 | 12/2014 | Chang et al. |
| 2014/0376550 A1 | 12/2014 | Khan et al. |
| 2015/0003450 A1 | 1/2015 | Salam et al. |
| 2015/0003458 A1 | 1/2015 | Li et al. |
| 2015/0003463 A1 | 1/2015 | Li et al. |
| 2015/0010001 A1 | 1/2015 | Duda et al. |
| 2015/0016461 A1 | 1/2015 | Qiang |
| 2015/0030024 A1 | 1/2015 | Venkataswami et al. |
| 2015/0046123 A1 | 2/2015 | Kato |
| 2015/0063353 A1 | 3/2015 | Kapadia et al. |
| 2015/0067001 A1 | 3/2015 | Koltsidas |
| 2015/0082432 A1 | 3/2015 | Eaton et al. |
| 2015/0092824 A1 | 4/2015 | Wicker, Jr. et al. |
| 2015/0121131 A1 | 4/2015 | Kiselev et al. |
| 2015/0127979 A1 | 5/2015 | Doppalapudi |
| 2015/0142840 A1 | 5/2015 | Baldwin et al. |
| 2015/0169313 A1 | 6/2015 | Katsura |
| 2015/0180672 A1 | 6/2015 | Kuwata |
| 2015/0207763 A1 | 6/2015 | Bertran Ortiz et al. |
| 2015/0205974 A1 | 7/2015 | Talley et al. |
| 2015/0120907 A1 | 8/2015 | Niestemski et al. |
| 2015/0222444 A1 | 8/2015 | Sarkar |
| 2015/0229546 A1 | 8/2015 | Somaiya et al. |
| 2015/0248366 A1 | 9/2015 | Bergsten et al. |
| 2015/0248418 A1 | 9/2015 | Bhardwaj et al. |
| 2015/0254003 A1 | 9/2015 | Lee et al. |
| 2015/0254088 A1 | 9/2015 | Chou et al. |
| 2015/0261446 A1 | 9/2015 | Lee |
| 2015/0263993 A1 | 9/2015 | Kuch et al. |
| 2015/0269048 A1 | 9/2015 | Marr et al. |
| 2015/0277804 A1 | 10/2015 | Arnold et al. |
| 2015/0281067 A1 | 10/2015 | Wu |
| 2015/0303949 A1 | 10/2015 | Jafarkhani et al. |
| 2015/0341237 A1 | 11/2015 | Cuni et al. |
| 2015/0341239 A1 | 11/2015 | Bertran Ortiz et al. |
| 2015/0358136 A1 | 12/2015 | Medard |
| 2015/0379150 A1 | 12/2015 | Duda |
| 2016/0004611 A1 | 1/2016 | Lakshman et al. |
| 2016/0011936 A1 | 1/2016 | Luby |
| 2016/0011942 A1 | 1/2016 | Golbourn et al. |
| 2016/0054922 A1* | 2/2016 | Awasthi ................ G06F 3/0631 |
| | | 711/103 |
| 2016/0062820 A1 | 3/2016 | Jones et al. |
| 2016/0070652 A1 | 3/2016 | Sundararaman et al. |
| 2016/0087885 A1 | 3/2016 | Tripathi et al. |
| 2016/0088083 A1 | 3/2016 | Bharadwaj et al. |
| 2016/0119159 A1 | 4/2016 | Zhao et al. |
| 2016/0119421 A1 | 4/2016 | Semke et al. |
| 2016/0139820 A1 | 5/2016 | Fluman et al. |
| 2016/0149639 A1 | 5/2016 | Pham et al. |
| 2016/0205189 A1 | 7/2016 | Mopur et al. |
| 2016/0210161 A1 | 7/2016 | Rosset et al. |
| 2016/0231928 A1* | 8/2016 | Lewis ..................... G06F 3/061 |
| 2016/0274926 A1 | 9/2016 | Narasimhamurthy et al. |
| 2016/0285760 A1 | 9/2016 | Dong |
| 2016/0292359 A1 | 10/2016 | Tellis et al. |
| 2016/0294983 A1 | 10/2016 | Kliteynik et al. |
| 2016/0334998 A1 | 11/2016 | George et al. |
| 2016/0366094 A1 | 12/2016 | Mason et al. |
| 2016/0378624 A1 | 12/2016 | Jenkins, Jr. et al. |
| 2016/0380694 A1 | 12/2016 | Guduru |
| 2017/0010874 A1 | 1/2017 | Rosset |
| 2017/0010930 A1 | 1/2017 | Dutta et al. |
| 2017/0019475 A1 | 1/2017 | Metz et al. |
| 2017/0068630 A1 | 3/2017 | Iskandar et al. |
| 2017/0168970 A1 | 6/2017 | Sajeepa et al. |
| 2017/0177860 A1 | 6/2017 | Suarez et al. |
| 2017/0212858 A1 | 7/2017 | Chu et al. |
| 2017/0273019 A1 | 9/2017 | Park et al. |
| 2017/0277655 A1 | 9/2017 | Das et al. |
| 2017/0337097 A1 | 11/2017 | Sipos et al. |
| 2017/0340113 A1 | 11/2017 | Charest et al. |
| 2017/0371558 A1 | 12/2017 | George et al. |
| 2018/0097707 A1* | 4/2018 | Wright ................... H04L 41/50 |

FOREIGN PATENT DOCUMENTS

| | | |
|---|---|---|
| EP | 2680155 | 1/2014 |
| GB | 2350028 | 5/2001 |
| JP | 2000-242434 | 9/2000 |
| TW | 1566104 | 1/2017 |
| WO | WO 2004/077214 | 9/2004 |
| WO | WO 2016/003408 | 1/2016 |
| WO | WO 2016/003489 | 1/2016 |

OTHER PUBLICATIONS

Author Unknown, "Configuration Interface for IBM System Storage DS5000, IBM DS4000, and IBM DS3000 Systems," IBM SAN Volume Controller Version 7.1, IBM® System Storage® SAN Volume Controller Information Center, Jun. 16, 2013, 3 pages.

Author Unknown, "Coraid EtherCloud, Software-Defined Storage with Scale-Out Infrastructure," Solution Brief, 2013, 2 pages, Coraid, Redwood City, California, U.S.A.

Author Unknown, "Coraid Virtual DAS (VDAS) Technology: Eliminate Tradeoffs between DAS and Networked Storage," Coraid Technology Brief, © 2013 Cora id, Inc., Published on or about Mar. 20, 2013, 2 pages.

Author Unknown, "Creating Performance-based SAN SLAs Using Finisar's NetWisdom" May 2006, 7 pages, Finisar Corporation, Sunnyvale, California, U.S.A.

Author Unknown, "Data Center, Metro Cloud Connectivity: Integrated Metro SAN Connectivity in 16 Gbps Switches," Brocade Communication Systems, Inc., Apr. 2011, 14 pages.

Author Unknown, "Data Center, SAN Fabric Administration Best Practices Guide, Support Perspective," Brocade Communication Systems, Inc., May 2013, 21 pages.

Author Unknown, "delphi—Save a CRC value in a file, without altering the actual CRC Checksum?" Stack Overflow, stackoverflow. com, Dec. 23, 2011, XP055130879, 3 pages http://stackoverflow.com/questions/8608219/save-a-crc-value-in-a-file-without-altering-the-actual-crc-checksum.

(56) References Cited

OTHER PUBLICATIONS

Author Unknown, "EMC UNISPHERE: Innovative Approach to Managing Low-End and Midrange Storage; Redefining Simplicity in the Entry-Level and Midrange Storage Markets," Data Sheet, EMC Corporation; published on or about Jan. 4, 2013 [Retrieved and printed Sep. 12, 2013] 6 pages http://www.emc.com/storage/vnx/unisphere.htm.
Author Unknown, "HP XP Array Manager Software—Overview & Features," Storage Device Management Software; Hewlett-Packard Development Company, 3 pages; © 2013 Hewlett-Packard Development Company, L.P.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "Network Transformation with Software-Defined Networking and Ethernet Fabrics," Positioning Paper, 2012, 6 pages, Brocade Communications Systems.
Author Unknown, "Recreating Real Application Traffic in Junosphere Lab," Solution Brief, Juniper Networks, Dec. 2011, 3 pages.
Author Unknown, "Shunra for HP Softwarer," Enabling Confidence in Application Performance Before Deployment, 2010, 2 pages.
Author Unknown, "Software Defined Networking: The New Norm for Networks," White Paper, Open Networking Foundation, Apr. 13, 2012, 12 pages.
Author Unknown, "Software Defined Storage Networks an Introduction," White Paper, Doc # 01-000030-001 Rev. A, Dec. 12, 2012, 8 pages; Jeda Networks, Newport Beach, California, U.S.A.
Author Unknown, "Standard RAID Levels," Wikipedia, the Free Encyclopedia, last updated Jul. 18, 2014, 7 pages; http://en.wikipedia.org/wiki/Standard_RAID_levels.
Author Unknown, "Storage Infrastructure for the Cloud," Solution Brief, © 2012, 3 pages; coraid, Redwood City, California, U.S.A.
Author Unknown, "Storage Area Network—NPIV: Emulex Virtual HBA and Brocade, Proven Interoperability and Proven Solution," Technical Brief, Apr. 2008, 4 pages, Emulex and Brocade Communications Systems.
Author Unknown, "The Fundamentals of Software-Defined Storage, Simplicity at Scale for Cloud-Architectures" Solution Brief, 2013, 3 pages; Coraid, Redwood City, California, U.S.A.
Author Unknown, "VirtualWisdom® SAN Performance Probe Family Models: Probe FC8, HD, and HD48," Virtual Instruments Data Sheet, Apr. 2014 Virtual Instruments. All Rights Reserved; 4 pages.
Author Unknown, "Xgig Analyzer: Quick Start Feature Guide 4.0," Feb. 2008, 24 pages, Finisar Corporation, Sunnyvale, California, U.S.A.
Author Unknown, "Sun Storage Common Array Manager Installation and Setup Guide," Software Installation and Setup Guide Version 6.7.x 821-1362-10, Appendix D: Configuring In-Band Management, Sun Oracle; retrieved and printed Sep. 12, 2013, 15 pages.
Author Unknown, "Vblock Solution for SAP: Simplified Provisioning for Operation Efficiency," VCE White Paper, VCE—The Virtual Computing Environment Company, Aug. 2011, 11 pages.
Berman, Stuart, et al., "Start-Up Jeda Networks in Software Defined Storage Network Technology," Press Release, Feb. 25, 2013, 2 pages, http://www.storagenewsletter.com/news/startups/jeda-networks.
Borovick, Lucinda, et al., "White Paper, Architecting the Network for the Cloud," IDC Analyze the Future, Jan. 2011, pp. 1-8.
Chakrabarti, Kaushik, et al., "Locally Adaptive Dimensionality Reduction for Indexing Large Time Series Databases," ACM Transactions on Database Systems, vol. 27, No. 2, Jun. 2009, pp. 188-228.
Chandola, Varun, et al., "A Gaussian Process Based Online Change Detection Algorithm for Monitoring Periodic Time Series," Proceedings of the Eleventh SIAM International Conference on Data Mining, SDM 2011, Apr. 28-30, 2011, 12 pages.
Cisco Systems, Inc. "N-Port Virtualization in the Data Center," Cisco White Paper, Cisco Systems, Inc., Mar. 2008, 7 pages.
Cisco Systems, Inc., "Best Practices in Deploying Cisco Nexus 1000V Series Switches on Cisco UCS B and C Series Cisco UCS Manager Servers," White Paper, Cisco Systems, Inc., Apr. 2011, 36 pages.
Cisco Systems, Inc., "Cisco Prime Data Center Network Manager 6.1," At-A-Glance, © 2012, 3 pages.
Cisco Systems, Inc., "Cisco Prime Data Center Network Manager," Release 6.1 Data Sheet, © 2012, 10 pages.
Cisco Systems, Inc., "Cisco Unified Network Services: Overcome Obstacles to Cloud-Ready Deployments," White Paper, Cisco Systems, Inc., Jan. 2011, 6 pages.
Clarke, Alan, et al., "Open Data Center Alliance Usage: Virtual Machine (VM) Interoperability in a Hybrid Cloud Environment Rev. 1.2," Open Data Center Alliance, Inc., 2013, pp. 1-18.
Cummings, Roger, et al., Fibre Channel—Fabric Generic Requirements (FC-FG), Dec. 4, 1996, 33 pages, American National Standards Institute, Inc., New York, New York, U.S.A.
Farber, Franz, et al. "An In-Memory Database System for Multi-Tenant Applications," Proceedings of 14th Business, Technology and Web (BTW) Conference on Database Systems for Business, Technology, and Web, Feb. 28 to Mar. 4, 2011, 17 pages, University of Kaiserslautern, Germany.
Guo, Chang Jie, et al., "IBM Resarch Report: Data Integration and Composite Business Services, Part 3, Building a Multi-Tenant Data Tier with with [sic] Access Control and Security," RC24426 (C0711-037), Nov. 19, 2007, 20 pages, IBM.
Hatzieleftheriou, Andromachi, et al., "Host-side Filesystem Journaling for Durable Shared Storage," $13^{th}$ USENIX Conference on File and Storage Technologies (FAST '15), Feb. 16-19, 2015, 9 pages; https://www.usenix.org/system/files/conference/fast15/fast15-paper-hatzieleftheriou.pdf.
Hedayat, K., et al., "A Two-Way Active Measurement Protocol (TWAMP)," Network Working Group, RFC 5357, Oct. 2008, 26 pages.
Horn, C., et al., "Online anomaly detection with expert system feedback in social networks," 2011 IEEE International Conference on Acoustics, Speech and Signal Processing (ICASSP), May 22-27, 2011, 2 pages, Prague; [Abstract only].
Hosterman, Cody, et al., "Using EMC Symmetrix Storage inVMware vSph ere Environments," Version 8.0, $EMC^2$Techbooks, EMC Corporation; published on or about Jul. 8, 2008, 314 pages; [Retrieved and printed Sep. 12, 2013].
Hu, Yuchong, et al., "Cooperative Recovery of Distributed Storage Systems from Multiple Losses with Network Coding," University of Science & Technology of China, Feb. 2010, 9 pages.
Keogh, Eamonn, et al., "Dimensionality Reduction for Fast Similarity Search in Large Time Series Databases," KAIS Long Paper submitted May 16, 2000; 19 pages.
Kolyshkin, Kirill, "Virtualization in Linux," Sep. 1, 2006, pp. 1-5.
Kovar, Joseph F., "Startup Jeda Networks Takes SDN Approach to Storage Networks," CRN Press Release, Feb. 22, 2013, 1 page, http://www.crn.com/240149244/printablearticle.htm.
Lampson, Butler, W., et al., "Crash Recovery in a Distributed Data Storage System," Jun. 1, 1979, 28 pages.
Lewis, Michael E., et al., "Design of an Advanced Development Model Optical Disk-Based Redundant Array of Independent Disks (RAID) High Speed Mass Storage Subsystem," Final Technical Report, Oct. 1997, pp. 1-211.
Lin, Jessica, "Finding Motifs in Time Series," SIGKDD'02 Jul. 23-26, 2002, 11 pages, Edmonton, Alberta, Canada.
Linthicum, David, "VM Import could be a game changer for hybrid clouds", InfoWorld, Dec. 23, 2010, 4 pages.
Long, Abraham Jr., "Modeling the Reliability of RAID Sets," Dell Power Solutions, May 2008, 4 pages.
Ma, AO, et al., "RAIDShield: Characterizing, Monitoring, and Proactively Protecting Against Disk Failures," FAST '15, $13^{th}$ USENIX Conference on File and Storage Technologies, Feb. 16-19, 2015, 17 pages, Santa Clara, California, U.S.A.
Mahalingam, M., et al., "Virtual eXtensible Local Area Network (VXLAN): A Framework for Overlaying Virtualized Layer 2 Networks over Layer 3 Networks," Independent Submission, RFC 7348, Aug. 2014, 22 pages; http://www.hjp.at/doc/rfc/rfc7348.html.

(56) References Cited

OTHER PUBLICATIONS

McQuerry, Steve, "Cisco UCS M-Series Modular Servers for Cloud-Scale Workloads," White Paper, Cisco Systems, Inc., Sep. 2014, 11 pages.
Monia, Charles, et al., IFCP—A Protocol for Internet Fibre Channel Networking, draft-monia-ips-ifcp-00.txt, Dec. 12, 2000, 6 pages.
Mueen, Abdullah, et al., "Online Discovery and Maintenance of Time Series Motifs," KDD'10 The 16th ACM SIGKDD International Conference on Knowledge Discovery and Data Mining, Jul. 25-28, 2010, 10 pages, Washington, DC, U.S.A.
Muglia, Bob, "Decoding SDN," Jan. 14, 2013, Juniper Networks, pp. 1-7, http://forums.juniper.net/t5/The-New-Network/Decoding-SDN/ba-p/174651.
Murray, Joseph F., et al., "Machine Learning Methods for Predicting Failures in Hard Drives: A Multiple-Instance Application," Journal of Machine Learning Research 6 (2005), pp. 783-816; May 2005, 34 pages.
Nelson, Mark, "File Verification Using CRC," Dr. Dobb's Journal, May 1, 1992, pp. 1-18, XP055130883.
Pace, Alberto, "Technologies for Large Data Management in Scientific Computing," International Journal of Modern Physics C., vol. 25, No. 2, Feb. 2014, 72 pages.
Pinheiro, Eduardo, et al., "Failure Trends in a Large Disk Drive Population," FAST '07, 5th USENIX Conference on File and Storage Technologies, Feb. 13-16, 2007, 13 pages, San Jose, California, U.S.A.
Raginsky, Maxim, et al., "Sequential Anomaly Detection in the Presence of Noise and Limited Feedback," arXiv:0911.2904v4 [cs.LG] Mar. 13, 2012, 19 pages.
Saidi, Ali G., et al., "Performance Validation of Network-Intensive Workloads on a Full-System Simulator," Interaction between Operating System and Computer Architecture Workshop, (IOSCA 2005), Austin, Texas, Oct. 2005, 10 pages.
Sajassi, A., et al., "BGP MPLS Based Ethernet VPN," Network Working Group, Oct. 18, 2014, 52 pages.
Sajassi, Ali, et al., "A Network Virtualization Overlay Solution using EVPN," L2VPN Workgroup, Nov. 10, 2014, 24 pages; http://tools.ietf.org/pdf/draft-ietf-bess-evpn-overlay-00.pdf.
Sajassi, Ali, et al., "Integrated Routing and Bridging in EVPN," L2VPN Workgroup, Nov. 11, 2014, 26 pages; http://tools.ietf.org/pdf/draft-ietf-bess-evpn-inter-subnet-forwarding-00.pdf.
Schroeder, Bianca, et al., "Disk failures in the real world: What does an MTTF of 1,000,000 hours mean to you?" FAST '07: 5th USENIX Conference on File and Storage Technologies, Feb. 13- 16, 2007, 16 pages, San Jose, California, U.S.A.
Shue, David, et al., "Performance Isolation and Fairness for Multi-Tenant Cloud Storage," USENIX Association, 10th USENIX Symposium on Operating Systems Design Implementation (OSDI '12), 2012, 14 pages; https://www.usenix.org/system/files/conference/osdi12/osdi12-final-215.pdf.
Staimer, Marc, "Inside Cisco Systems' Unified Computing System," Dragon Slayer Consulting, Jul. 2009, 5 pages.
Swami, Vijay, "Simplifying SAN Management for VMWare Boot from SAN, Utilizing Cisco UCS and Palo," posted May 31, 2011, 6 pages.
Tate, Jon, et al., "Introduction to Storage Area Networks and System Networking," Dec. 2017, 302 pages, ibm.com/redbooks.
Vuppala, Vibhavasu, et al., "Layer-3 Switching Using Virtual Network Ports," Computer Communications and Networks, 1999, Proceedings, Eight International Conference in Boston, MA, USA, Oct. 11-13, 1999, Piscataway, NJ, USA, IEEE, ISBN: 0-7803-5794-9, pp. 642-648.
Wang, Feng, et al. "OBFS: A File System for Object-Based Storage Devices," Storage System Research Center, MSST. vol. 4., Apr. 2004, 18 pages.
Weil, Sage A., "Ceph: Reliable, Scalable, and High-Performance Distributed Storage," Dec. 2007, 239 pages, University of California, Santa Cruz.
Weil, Sage A., et al. "CRUSH: Controlled, Scalable, Decentralized Placement of Replicated Data." Proceedings of the 2006 ACM/IEEE conference on Supercomputing. ACM, Nov. 11, 2006, 12 pages.
Weil, Sage A., et al. "Ceph: A Scalable, High-performance Distributed File System," Proceedings of the 7th symposium on Operating systems design and implementation. USENIX Association, Nov. 6, 2006, 14 pages.
Wu, Joel, et al., "The Design, and Implementation of AQuA: An Adaptive Quality of Service Aware Object-Based Storage Device," Department of Computer Science, MSST, May 17, 2006, 25 pages; http://storageconference.us/2006/Presentatons/30Wu.pdf.
Xue, Chendi, et al. "A Standard framework for Ceph performance profiling with latency breakdown," CEPH, Jun. 30, 2015, 3 pages.
Zhou, Zihan, et al., "Stable Principal Component Pursuit," arXiv:1001.2363v1 [cs.IT], Jan. 14, 2010, 5 pages.
Zhu, Yunfeng, et al., "A Cost-based Heterogeneous Recovery Scheme for Distributed Storage Systems with RAID-6 Codes," University of Science & Technology of China, 2012, 12 pages.
Aweya, James, et al., "Multi-level active queue management with dynamic thresholds," Elsevier, Computer Communications 25 (2002) pp. 756-771.
Petersen, Chris, "Introducing Lightning: A flexible NVMe JBOF," Mar. 9, 2016, 6 pages.
Stamey, John, et al., "Client-Side Dynamic Metadata in Web 2.0," SIGDOC '07, Oct. 22-24, 2007, pp. 155-161.

\* cited by examiner

STORAGE AREA NETWORK BASED EXTENDED I/O METRICS COMPUTATION FOR DEEP INSIGHT INTO APPLICATION PERFORMANCE

TECHNICAL FIELD

This disclosure relates in general to the field of computer networking, and more particularly, though not exclusively, to Storage Area Network ("SAN") based I/O metrics computation for deep insight into application performance.

BACKGROUND

Today's data centers run a multitude of applications, or "workloads," that generate I/O. An understanding of the I/O characteristics of an application from various metrics collected is crucial for effective placement of application data to external storage devices and make full use of consolidation advantages that external SAN-based storage has to offer. A lack of such an understanding often leads to application inefficiencies and storage over-provisioning. Many storage admins employ rule-of-thumb and ad hoc techniques for mapping the applications to storage volumes, or logical unit numbers ("LUNs"). In a SAN environment, the LUNs are on storage arrays and different physical storage media in the backend. A popular rule-of-thumb is to mount top-tier applications to an all flash array LUN and lower tier applications to a disk-based LUN. While such methods may work in some deployments, it is not a one-size-fits-all approach. Storage capacity over-provisioning is also a common trend in anticipation of real or perceived performance issues; however, this approach is inefficient and expensive. The applications data volume (LUN) capacity and its placement are decisions that are better guided by detailed application I/O characterization and real time analysis since most applications have a complex mix of I/O patterns. A good understanding of I/O characteristics of applications that use a shared, consolidated storage is critical in designing an efficient storage infrastructure.

Messaging servers (e.g., MS Exchange) and databases (e.g., MS SQL Server) are typical applications that use a SAN for block-based I/O operations. Most of these applications can be further broken down into various components. For example, for SQL components may include database transactions, index access, log write, etc. Each of these components have different I/O patterns and thus need to be supported by different back-end storage devices typically mapped to a separate LUNs.

Some of OS vendors provide tools that can help measure the I/O emanating from each application; however, given the multiple places in the storage stack where this can be measured (e.g., file system layer, block layer, SCSI layer, etc.) the accuracy of the measurement is a concern. Also, in a mixed OS environment, managing multiple diverse OS vendor-provided tools can be a tedious task. In contrast, a SAN network-based tool that can measure I/O characteristics as seen on the wire using a vendor-neutral approach would be most appealing to administrators.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

DETAILED DESCRIPTION OF EXAMPLE EMBODIMENTS

Overview

Figure 1:
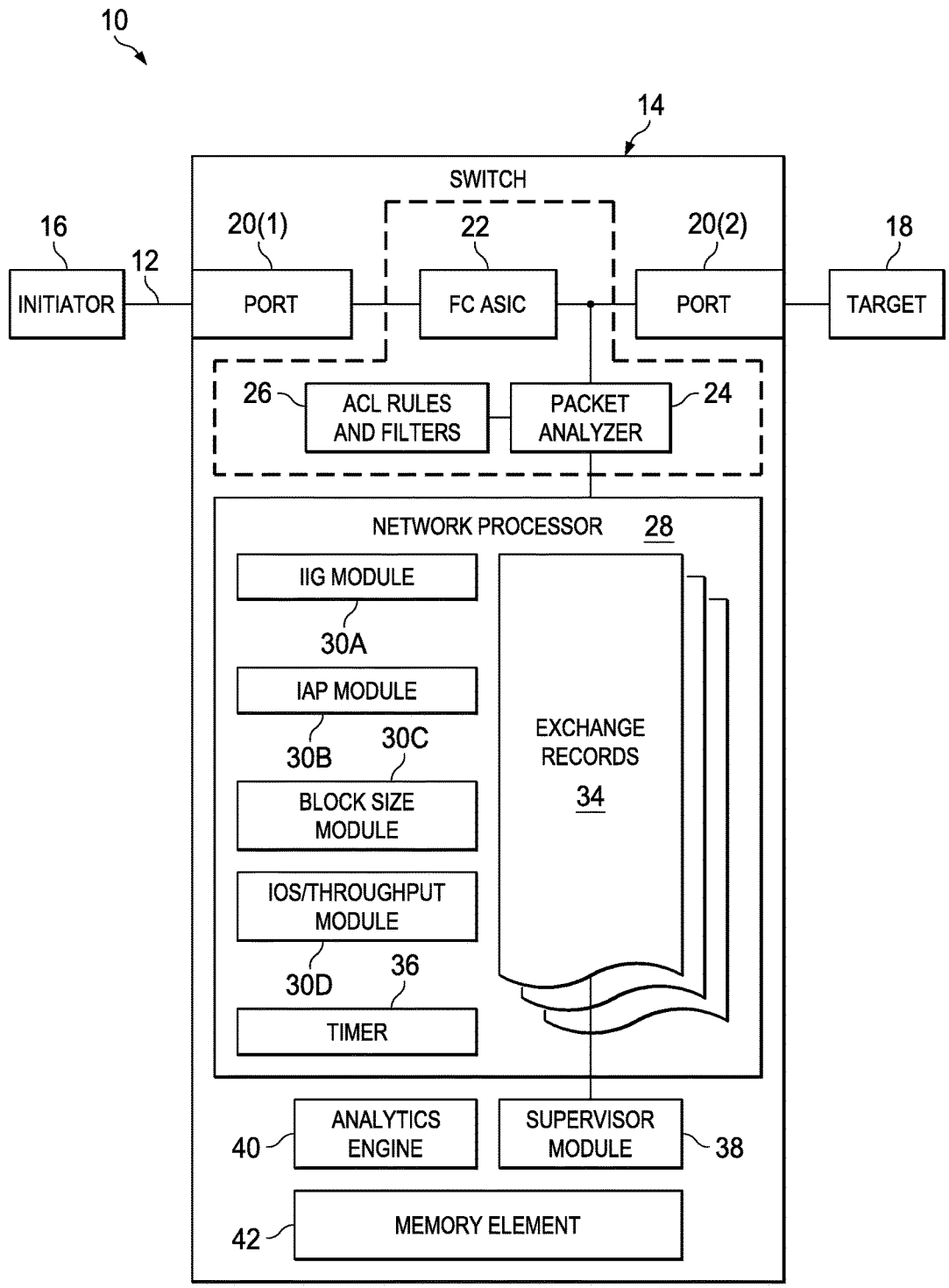
FIG. 1 is a simplified block diagram illustrating a communication system for computation of extended I/O metrics in a SAN environment in accordance with embodiments described herein.

A method is described and in one embodiment includes monitoring by an integrated circuit device READ/WRITE commands in connection with a flow of an application executing in a Fibre Channel Storage Area Network ("FC-SAN"); determining from the monitored READ/WRITE commands at least one metric for characterizing I/O performance of the application with respect to a storage device, wherein the at least one metric includes at least one of an inter I/O gap ("IIG"), a Logical Unit Number ("LUN") I/O access pattern ("IAP"), relative block size, I/O operations per second ("IOPS") and throughput, and IOPS per virtual server; storing the calculated at least one metric in a flow record associated with the flow; using the calculated at least one metric to identify a storage device for use by the flow, wherein the calculated at least one metric is indicative of a performance of the application in the FC-SAN.

EXAMPLE EMBODIMENTS

The following discussion references various embodiments. However, it should be understood that the disclosure is not limited to specifically described embodiments.

Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or Flash memory), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object-oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Turning to FIG. 1, FIG. 1 is a simplified block diagram illustrating a communication system 10 for extended I/O metrics computation for enabling deep insight into application performance in a Storage Area Network ("SAN") environment in accordance with one example embodiment. In particular, FIG. 1 illustrates a SAN 12 comprising a switch 14 facilitating communication between an initiator 16 and a target 18 in SAN 12. Switch 14 includes a plurality of ports, for example, ports 20(1) and 20(2). A fixed function Fibre Channel ("FC") application specific integrated circuit ("ASIC") 22 facilitates switching operations within switch 14. A packet analyzer 24 may sniff frames traversing switch 14 and apply access control list ("ACL") rules and filters 26 to copy some of the frames to a network processor ("NPU") 28. In various embodiments, packet analyzer 24 and ACL rules and filters 26 may be implemented in FC ASIC 22. Unlike the non-programmable FC ASIC 22, network processor 28 comprises a programmable microprocessor. In some embodiments, network processor 28 may be optimized for processing network data packets and SAN frames. Specifically, network processor 28 may be configured to handle tasks such as header parsing, pattern matching, bit-field manipulation, table look-ups, packet modification, and data movement.

In various embodiments, network processor 28 may be configured to compute and analyze primary flow performance parameters, or metrics, such as maximum pending exchanges ("MPE") and exchange completion time ("ECT"). Additionally, in accordance with features of embodiments described in greater detail hereinbelow, network processor may be configured to compute and analyze a suite of enhanced flow performance parameters, or metrics, including (1) Inter I/O Gap ("IIG"), (2) I/O Access Pattern ("IAP"), (3) I/O Block Sizes, (4) I/O Operations per Second ("IOPS") and Throughout, and (5) IOPS per Virtual Server, using an appropriate one of compute modules 30A-30E. Exchange records 34 comprising flow details may be stored in network processor 28. A timer 36 may facilitate various timing operations of network processor 28. A supervisor module 38 may periodically extract exchange records 34 for further higher level analysis, for example, by an analytics engine 40. A memory element 42 may represent a totality of all memory in switch 14. Note that in various embodiments, switch 14 may include a plurality of line cards with associated ports, each line card including a separate FC ASIC 22 and network processor 28. The multiple line cards may be managed by a single supervisor module 38 in switch 14.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

FC is a high speed serial interface technology that supports several higher layer protocols including Small Computer System Interface ("SCSI") and Internet Protocol ("IP"). FC is a gigabit speed networking technology primarily used in SANs. SANs include servers and storage (SAN devices being called nodes) interconnected via a network of SAN switches using FC protocol for transport of frames. The servers host applications that eventually initiate READ and WRITE operations (also called input/output ("I/O") operations) of data towards the storage. Nodes work within the provided FC topology to communicate with all other nodes. Before any IO operations can be executed, the nodes login to the SAN (e.g., through fabric login ("FLOGI") operations) and then to each other (e.g., through port login ("PLOGI") operations).

The data involved in I/O operations originate as Information Units ("IU") passed from an application to the transport protocol. The IUs are packaged into frames for transport in the underlying FC network. In a general sense, a frame is an indivisible IU that may contain data to record on disc or control information such as a SCSI command. Each frame comprises a string of transmission words containing data bytes.

Every frame is prefixed by a start-of-field ("SOF") delimiter and suffixed by an end-of-field ("EOF") delimiter. All frames also include a 24 bytes long frame header in addition to a payload (e.g., which may be optional, but normally present, with size and contents determined by the frame type). The header is used to control link operation and device protocol transfers, and to detect missing frames or frames that are out of order. Various fields and subfields in the frame header can carry meta-data (e.g., data in addition to payload data, for transmitting protocol specific information). For example, frame header subfields in a F_CTL field are used to identify a beginning, middle, and end of each frame sequence. In another example, each SCSI command, which is transported in FC as an IU, has an SCSI header that includes an FCP_DL field, indicative of the maximum number of all bytes to be transferred to the application client buffer in appropriate payloads by the SCSI command. The FCP_DL field contains the exact number of data bytes to be transferred in the I/O operation.

One or more frames form a sequence and multiple such sequences comprise an exchange. The I/O operations in the SAN involves one or more exchanges, with each exchange assigned a unique Originator eXchange IDentifier ("OXID") carried in the frame header. Exchanges are an additional layer that control operations across the FC topology, providing a control environment for transfer of information.

In a typical READ operation, the first sequence is a SCSI READ_CMD command from the server (initiator) to storage (target). The first sequence is followed by a series of SCSI data sequences from storage to server and a last SCSI status sequence from storage to server. The entire set of READ operation sequences form one READ exchange. A typical WRITE operation is also similar, but in the opposite direction (e.g., from storage to server) with an additional TRANSFER READY sequence, completed in one WRITE exchange. At a high level, all data I/O operations between the server and the storage can be considered as a series of exchanges over a period of time.

In the past, SANs were traditionally small networks with few switches and devices and the SAN administrators' troubleshooting role was restricted to device level analysis using tools provided by server and/or storage vendors (e.g., EMC Ionix Control Center™, HDS Tuning Manager™, etc.). In contrast, current data center SANs involve a large network of FC switches that interconnect servers to storage. With servers becoming increasingly virtualized (e.g., virtual machines ("VMs")) and/or mobile (e.g., migrating between servers) and storage capacity requirement increasing exponentially, there is an explosion of devices that login into the data center SAN. The increase in number of devices in the SAN also increases the number of ports, switches and tiers in the network.

Larger networks involve additional complexity of management and troubleshooting attributed to slow performance of the SAN. In addition to complex troubleshooting of heterogeneous set of devices from different vendors, the networking in large scale SANs include multi-tier switches that may have to be analyzed and debugged for SAN performance issues. One common problem faced by administrators is determining the root cause of application slowness suspected to arise in the SAN. The effort can involve identifying various traffic flows from the application in the SAN, segregating misbehaving flows and eventually identifying the misbehaving devices, links (e.g., edge ports/ ISLs), or switches in the SAN. Because the exchange is the fundamental building block of all I/O traffic in the SAN, identifying slow exchanges can be important to isolate misbehaving flows of the SAN. While primary I/O metrics, such as ECT and MPE, are useful for measuring basic I/O performance, a suite of enhanced I/O metrics described herein are critical for enabling deep understanding of an application's I/O patterns.

Communication system 10 is configured to address these issues (among others) to offer a system and method for extended I/O metrics computation for enabling deep insight into application performance in a SAN environment. According to various embodiments, switch 14 receives a plurality of frames of an exchange between initiator 16 and target 18 in SAN 12. Packet analyzer 24 in switch 14 may identify a beginning frame and an ending frame of the exchange in the plurality of frames. In various embodiments, packet Switch Port Analyzer ("SPAN") functionality of packet analyzer 24 may be used to setup ACL rules/filters 26 to match on specific frame header fields and redirect (e.g., copy) frames that match the rules to network processor 28 on switch 14.

In various embodiments, ACL rules and filters 26 for packet analyzer 24 may be programmed on edge ports (e.g., 20(2)) connected to targets (e.g., 18) to SPAN frames that have the exchange bit set in the FC header's FCTL bits of the first and last frames of the exchange. In some embodiments, because the first and last frames of the exchange may be traversing different directions of the edge ports (e.g., 20(2)), ACL rules and filters 26 may be programmed in both ingress and egress directions of the edge ports (e.g., 20(2)).

Network processor 28 of switch 14 may extract values of a portion of fields in respective headers of the beginning frame and the ending frame and copy the values into exchange records 34 in network processor 28. Exchange records 34 may be indexed by several flow parameters in network processor 28's memory. For example, a "READ" SCSI command spanned from port 20(2) may result in a flow record entry created with various parameters such as {port, source identifier ("SID"), destination identifier ("DID"), logical unit number ("LUN"), OXID, SCSI_CMD, Start-Time, End-Time, Size} extracted from frame headers.

Network processor 28 may calculate a normalized ECT based on the values stored in exchange records 34. In various embodiments, network processor 28 may start timer 36 when the beginning frame is identified, and stop timer 36 when the ending frame is identified. For example, after the last data is read out from target 18, a Status SCSI command may be sent out by target 18, and may comprise the last frame of the exchange on the ingress direction of storage port 20(2). The frame may be spanned to network processor 28 and may complete the flow record with the exchange end-time. ECT may be calculated as a time elapsed between starting and stopping timer 36. By calculating the total time taken and normalizing it against the size of the exchange, the ECT of the flow can be derived. A baseline ECT maintained for the flow may be compared with the current ECT (e.g., most recent ECT calculated) and the baseline updated or the current ECT red-flagged as a deviation (e.g., the calculated ECT may be flagged appropriately if a deviation is observed from the baseline ECT). A "WRITE" SCSI operation also follows a similar procedure.

In some embodiments, switch 14 may receive frames of a plurality of exchanges between various initiators and targets in SAN 12. Note that switch 14 may comprise numerous ports of various speeds switching FC frames that are part of different exchanges, using one or more high speed custom FC ASIC 22. Switch 14 may collect a plurality of exchange records 34 corresponding to the different exchanges in SAN 12, with each exchange record comprising values extracted from the corresponding exchange. Network processor 28 may calculate the MPE for target 18 based on the plurality of exchange records 34 associated with target 18. By calculating the number of flow records at network processor 28 that are outstanding (e.g., incomplete) for target 18, the MPE of target 18 can be deduced. Each flow record in exchange records 34 may have an inactivity timer associated therewith, for example, so that flows that are dormant for long periods may be flushed out from the memory of network processor 28.

In various embodiments, a software application, such as analytics engine 40, executing on supervisor module 38 or elsewhere (e.g., in a separate network element) may periodically extract exchange records 34 from memory of network processor 28 (e.g., before they are deleted) for consolidation at the flow level and for presentation to a SAN administrator (or other user).

In various embodiments, network processor 28 can store and calculate the enhanced metrics described herein for all the flows of the frames directed towards it using its own compute resources. Because the speed of the link connecting FC ASIC 22 to network processor 28 cannot handle substantially all frames entering FC ASIC 22, packet analyzer 24 can serve to reduce the volume of live traffic from FC ASIC 22 flowing towards network processor 28. For example, only certain SCSI command frames required for identifying flows and calculating enhanced parameters may be copied to network processor 28. Other SCSI data frames forming the bulk of typical exchanges need not be copied. Also, as the frame headers can be sufficient to identify a particular exchange, fields beyond the FC and SCSI headers can be truncated before copying the frame to network processor 28. Note that in some embodiments where the volume of traffic passing through FC ASIC 22 is not large, one or more of the modules 30A-30E may execute in FC ASIC 22, rather than in network processor 28.

In various embodiments, SAN I/O flow performance parameters can facilitate troubleshooting issues attributed to slowness of SANs. The on-switch implementation according to embodiments of communication system 10 to measure SAN performance parameters can eliminate hooking up third-party appliances and software tools to monitor SAN network elements and provide a single point of monitoring and troubleshooting of SAN 12. Embodiments of communication system 10 can facilitate flow level visibility for troubleshooting "application slowness" issues in SAN 12. No additional hardware need be inserted into SAN 12 to calculate flow level performance parameters of I/O operations.

In addition, in various embodiments, drastic reduction in frame copies may be achieved. The amount of traffic tapped for analysis may be miniscule compared to the live traffic flowing through switch 14, for example, because ACL rules copy out certain frames of interest and further strip everything other than portions of the frame headers in the copied frames. The on-switch implementation according to embodiments of communication system 10 can reduce cost by eliminating third-party hardware and solution integration costs. Further reduction of power consumption, rack space, optics etc. can result in additional savings. Integration with existing software management tools (e.g., Cisco® Data Center Network Manager (DCNM)) can provide a single point of monitoring and troubleshooting for the SAN administrator.

Turning to the infrastructure of communication system 10, the network topology can include any number of initiators, targets, servers, hardware accelerators, virtual machines, switches (including distributed virtual switches), routers, and other nodes inter-connected to form a large and complex network. Network 12 represents a series of points or nodes of interconnected communication paths for receiving and transmitting packets and/or frames of information that are delivered to communication system 10. A node may be any electronic device, printer, hard disk drive, client, server, peer, service, application, or other object capable of sending, receiving, or forwarding information over communications channels in a network, for example, using FC and other such protocols. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Network 12 offers a communicative interface between targets (e.g., storage devices) 18 and/or initiators (e.g., hosts) 16, and may be any local area network ("LAN"), wireless local area network ("WLAN"), metropolitan area network ("MAN"), Intranet, Extranet, WAN, virtual private network ("VPN"), or any other appropriate architecture or system that facilitates communications in a network environment and can provide lossless service, for example, similar to (or according to) Fibre Channel over Ethernet ("FCoE") protocols. Network 12 may implement any suitable communication protocol for transmitting and receiving data packets within communication system 10. The architecture of the present disclosure may include a configuration capable of TCP/IP, FC, FCoE, and/or other communications for the electronic transmission or reception FC frames in a network. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines ("DSL"), telephone lines, T1 lines, T3 lines, wireless, satellite, fiber optics, cable, Ethernet, etc. or any combination thereof) and/or through any additional networks such as a wide area networks (e.g., the Internet).

In various embodiments, switch 14 may comprise a Cisco® MDS™ series multilayer SAN switch. In some embodiments, switch 14 may be to provide line-rate ports based on a purpose-built "switch-on-a-chip" FC ASIC 22 with high performance, high density, and enterprise-class availability. The number of ports may be variable, for example, from 24 to 32 ports. In some embodiments, switch 14 may offer non-blocking architecture, with all ports operating at line rate concurrently.

In some embodiments, switch 14 may match switch-port performance to requirements of connected devices. For example, target-optimized ports may be configured to meet bandwidth demands of high-performance storage devices, servers, and Inter-Switch Links ("ISLs"). Switch 14 may be configured to include hot-swappable, Small Form-Factor Pluggable ("SFP"), LC interfaces. Individual ports can be configured with either short- or long-wavelength SFPs for connectivity up to 500 m and 10 km, respectively. Multiple switches can also be stacked to cost effectively offer increased port densities.

In some embodiments, network processor 28 may be included in a service card plugged into switch 14. In other embodiments, network processor 28 may be inbuilt in a line card with a direct connection to FC ASIC 22. In some embodiments, the direct connection between network processor 28 and FC ASIC 22 can comprise a 10 G XFI or 2.5 G SGMII link (Ethernet). In yet other embodiments, network processor 28 may be incorporated with FC ASIC 22 in a single semiconductor chip. In various embodiments, each one of modules 30A-30E comprises applications that are executed by network processor 28 in switch 14. Note that an "application" as used herein this Specification, can be inclusive of an executable file comprising instructions that can be understood and processed on a computer, and may further include library modules loaded during execution, object files, system files, hardware logic, software logic, or any other executable modules.

In various embodiments, packet analyzer 24 comprises a network analyzer, protocol analyzer or packet sniffer, including a computer program or a piece of computer hardware that can intercept and log traffic passing through switch 14. As frames flow across switch 14, packet analyzer 24 captures each frame and, as needed, decodes the frame's raw data, showing values of various fields in the frame, and analyzes its content according to appropriate ACL rules and filters 26. ACL rules and filters 26 comprises one or more rules and filters for analyzing frames by packet analyzer 24.

In various embodiments, FC ASIC 22 comprises an ASIC that can build and maintain filter tables, also known as content addressable memory tables for switching between ports 20(1) and 20(2) (among other ports). Analytics engine 40 and supervisor module 38 may comprise applications executing in switch 14 or another network element coupled to switch 14. In some embodiments, supervisor module 38 may periodically extract data from network processor 28 and aggregate suitably. In some embodiments, software executing on supervisor module 38 can connect over a 1/2.5 G GMII link to network processor 28.

Figure 2:
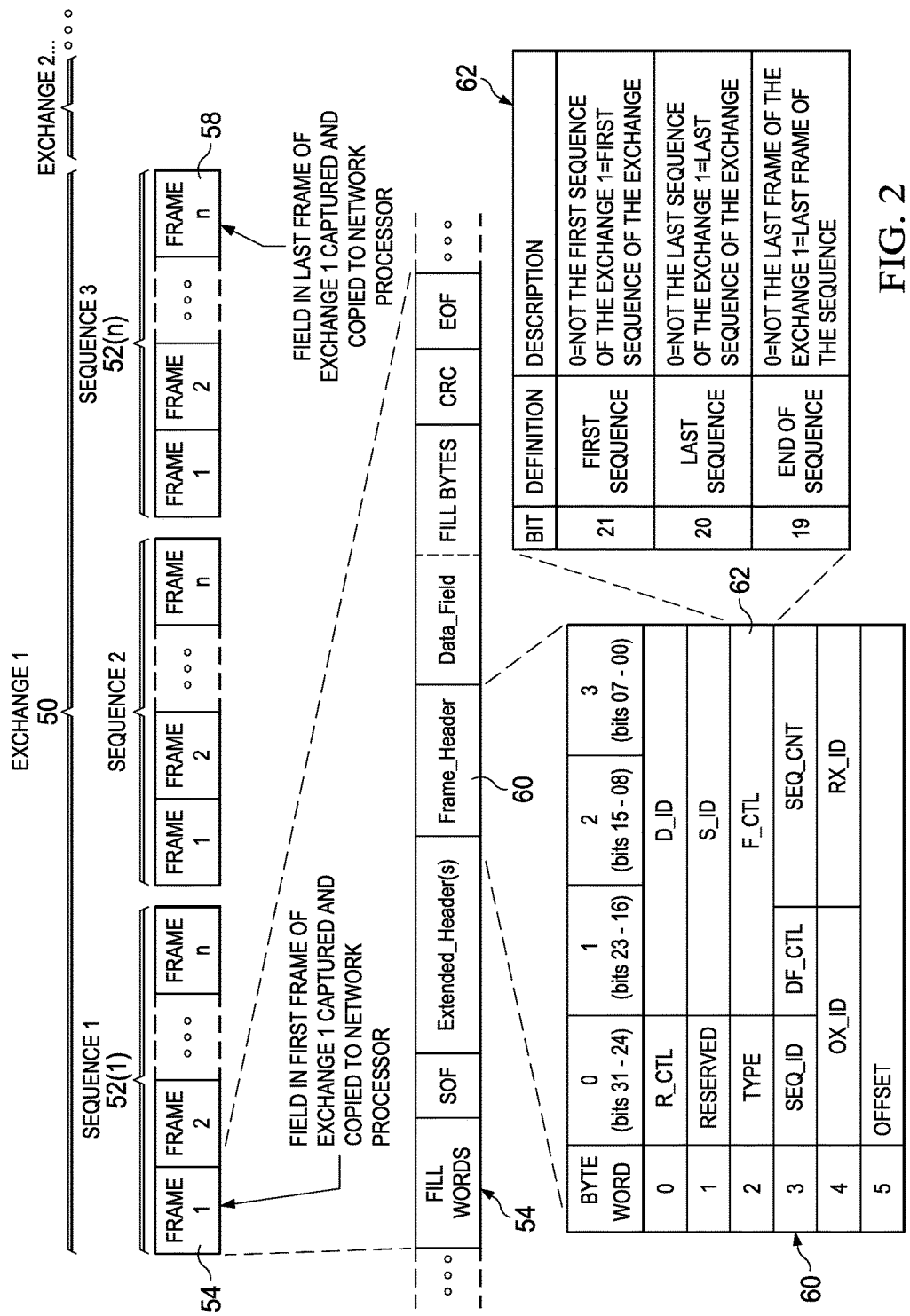
FIG. 2 is a simplified block diagram illustrating example details of embodiments of the communication system.

Turning to FIG. 2, FIG. 2 is a simplified block diagram illustrating example details of an embodiment of communication system 10. An example exchange 50 comprises a plurality of sequences 52(1)-52(n). Each sequence 52(i) comprises one or more frames. A first frame 54 of exchange 50 and a last frame 58 of exchange 50 may be identified by packet analyzer 22 and selected values copied to network processor 28. For example, frame 54 may include a frame header 60, which may include a F_CTL field 62. A value of 1 in bit 21 of F_CTL field 62 indicates that sequence 52(1) is a first one of exchange 50. All frames in sequence 52(1) may have a value of 1 in bit 21 of F_CTL field 62. On the other hand, all frames in last sequence 52(n) of exchange 50 may have a value of 0 in bit 21 of F_CTL field 62 and a value of 1 in bit 20 of F_CTL field 62. In addition, the last frame of any sequence, for example, frame 58, has a value of 1 in bit 19 of F_CTL field 62.

Thus, packet analyzer 22 may analyze bits 19-21 of F_CTL field 62 of each frame between ports 20(1) and 20(2) in switch 14. A first frame of exchange 50 having values {0,0,1} in bits 19-21, respectively may be copied to network processor 28. Another frame of exchange 50 having values {1,1,0} in bits 19-21 respectively, representing the last frame of exchange 50 may also be copied to network processor 28.

Figure 3:
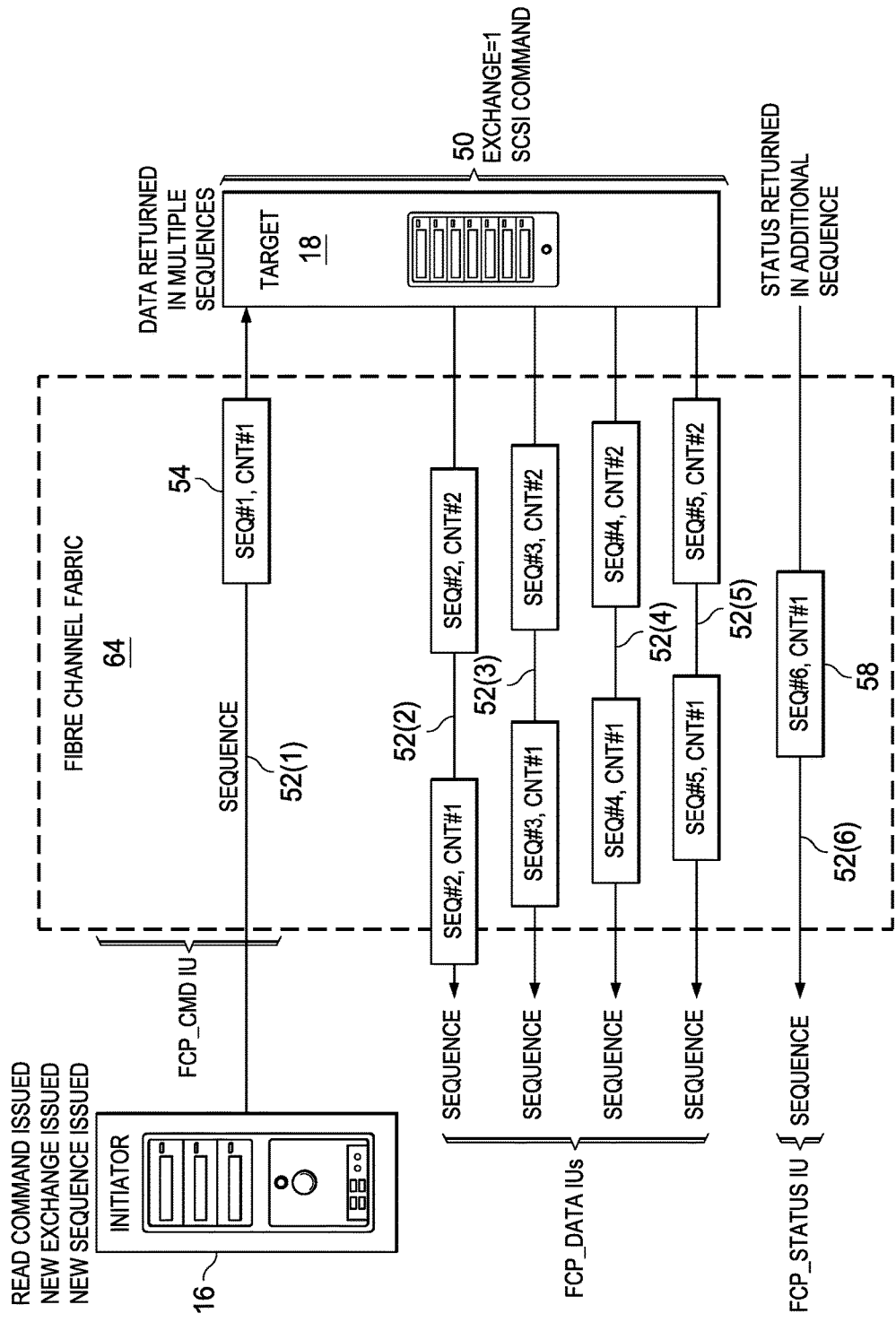
FIG. 3 is a simplified block diagram illustrating other example details of embodiments of the communication system.

Turning to FIG. 3, FIG. 3 is a simplified block diagram illustrating example details of an embodiment of communication system 10. Example exchange 50 may comprise a READ operation initiated by a READ command at initiator 16 in frame 54 of sequence 52(1) and sent to target 18 over FC fabric 64. FC fabric 64 may comprise one or more switches 14. In an example embodiment, FC fabric 64 may comprise a totality of all switches and other network elements in SAN 12 between initiator 16 and target 18. In other embodiments, FC fabric 64 may comprise a single switch in SAN 12 between initiator 16 and target 18.

Target 18 may deliver the requested data to initiator 16 in a series of sequences, for example, sequences 52(2)-52(5) comprising FC_DATA IUs. Target 18 may complete exchange 50 by sending a last frame 58 in sequence 52(6) to initiator 16. Packet analyzer 22 in FC fabric 64 may capture and copy frames 54 and 58 comprising the first and last frame of exchange 50 for example, for computing ECT of exchange 50 and MPE of target 18.

Figure 4:
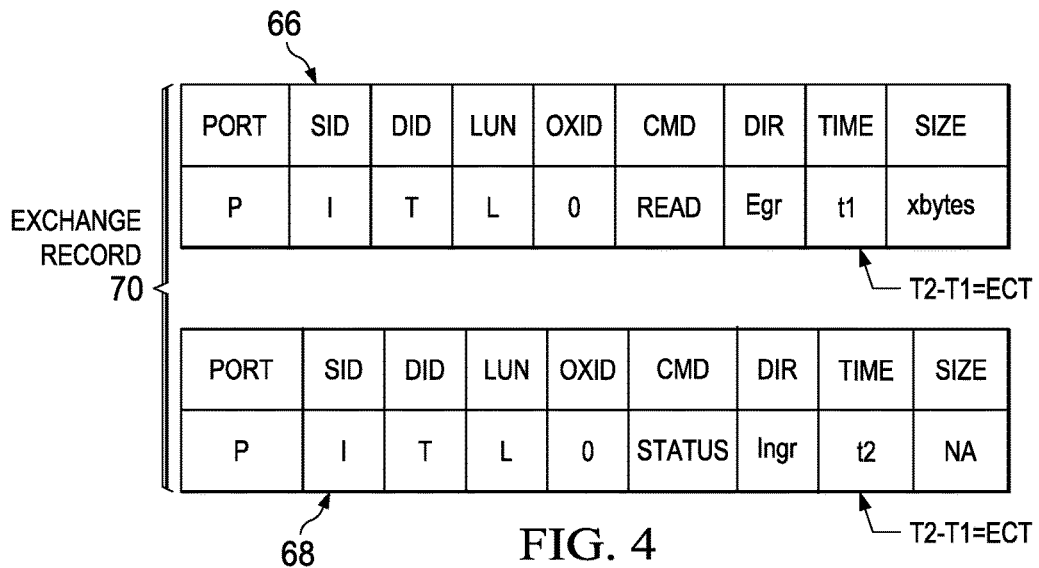
FIG. 4 is a simplified block diagram illustrating yet other example details of embodiments of the communication system.

Turning to FIG. 4, FIG. 4 is a simplified block diagram illustrating example details of an embodiment of communication system 10. An example READ command may be received on egress switch port 20(2) of target 18. The Exchange Originator bit may be set in F_CTL field 62, indicating a first frame of the exchange. Data size of READ command may be present in FCP_DL field of the SCSI header. An example flow record entry 66 may be created to include the port number, source ID, destination ID, LUN, exchange ID, command type (e.g., READ, WRITE, STATUS), direction of traffic (e.g., ingress, egress), time (e.g., start of timer, stop of timer) and size (e.g., from FCP_DL field).

After the last data read out, target 18 may send a STATUS command on ingress port of target 18 with an OK/CHECK condition, with a last sequence of exchange bit set in F_CTL field 62. Another example flow record entry 68 may be created to include the port number, source ID, destination ID, LUN number, exchange ID, command type, direction, time and size. Flow record entries 66 and 68 may together comprise one exchange record 70. The difference between times T2 and T1, representing the stop and start of timer 36, respectively, can indicate the ECT. Normalizing may be achieved by dividing the computed ECT with the size of the data transfer (e.g., in flow record entry 66). In various embodiments, the number of flow record entries 66 (corresponding to exchange origination) associated with a particular target 18 that do not have matching entries 68 (corresponding to the last data read out) may indicate the MPE associated with target 18.

As previously noted, embodiments described herein enable computation and storage of a suite of enhanced I/O metrics that are critical for enabling deep understanding of an application's I/O patterns. As also noted above, the enhanced metrics described herein include (1) Inter I/O Gap ("IIG"), (2) I/O Access Pattern ("IAP"), (3) I/O Block Sizes, (4) I/O Operations per Second ("IOPS") and Throughput, and (5) IOPS per Virtual Server.

IIG is a measure of the time interval between consecutive I/O requests and is a good indicator of the I/O burstiness (peaks and troughs pattern) of the application traffic. Most of the Solid State Drive ("SSD")-based storage arrays are NAND flash based and are extremely fast when compared to Hard Disk Drive ("HDD")-based storage arrays. I/O READ operations on the fastest spinning HDD are in the few milliseconds range, while for SSDs such operations are in the microseconds range. As a result, READ operations on an SSD device may get serviced much faster with very little or no queuing as compared to a queue-based system like an HDD. The applications generating intense READ operations with very small IIG will gain significant performance improvement when moved to a SSD device as compared to a HDD. By measuring and trending the IIG of READ operations of a HDD-based LUN against the I/O queue depth buildup on the host, recommendations can be provided to move the application to a LUN of a flash-based array for performance improvements. Additionally, IIG can be used in conjunction with I/O latency and Exchange Completion Times ("ECT"), IIG can be used to compare the SSD-based array performance of different vendors, so that the most important application is provisioned on the LUN of the best performing array.

Figure 5:
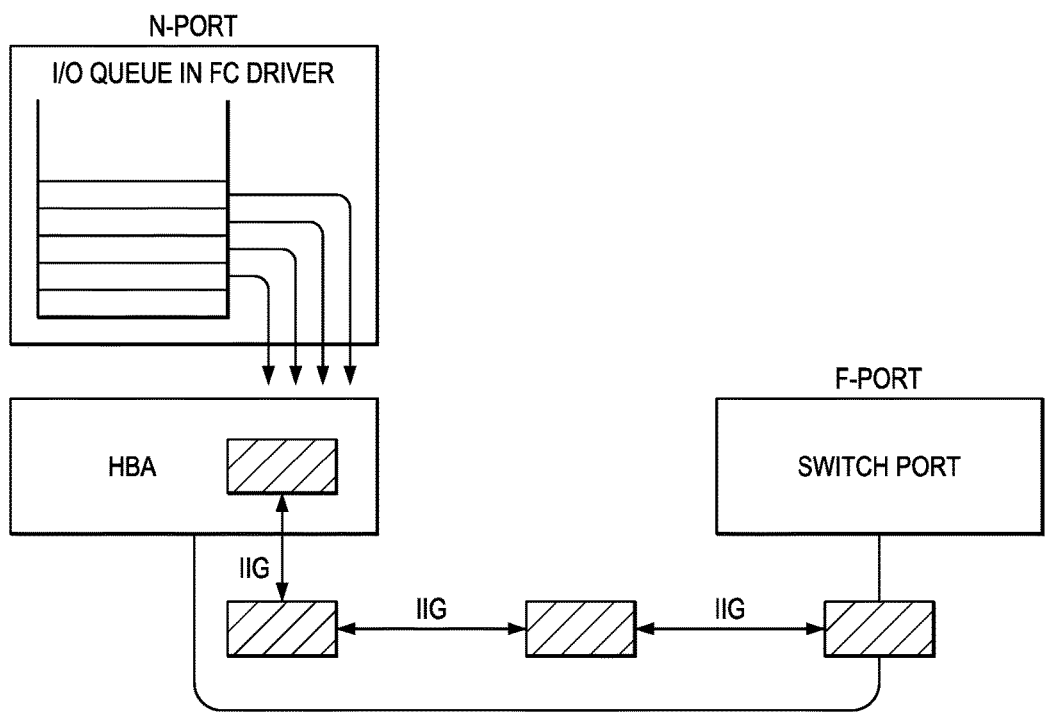
FIG. 5 is a simplified block diagram illustrating Inter I/O Gap ("IIG") in accordance with embodiments described herein.

As illustrated in FIG. 5, IIG is measured in the context of I/O queue depth only, as queuing happens within the FC driver and I/O requests are not sent out after the queue limit is reached. The Min/Max/Avg calculations happen in units of queue depth only. It will be noted that after the queue is full, I/Os are buffered within the OS and not sent to the network. As a result, IAP between I/Os when the queue full condition occurs and the queue full condition subsides may be large and may need to be ignored. The value of the queue depth might not be readily available on the network. The value may have to be fed via an external mechanism that would query the end device (server) APIs for queue depth and store the value in the NPU. Alternatively, the MPE calculation within the NPU may be taken as a fair approximation of queue-depth.

Figure 6:
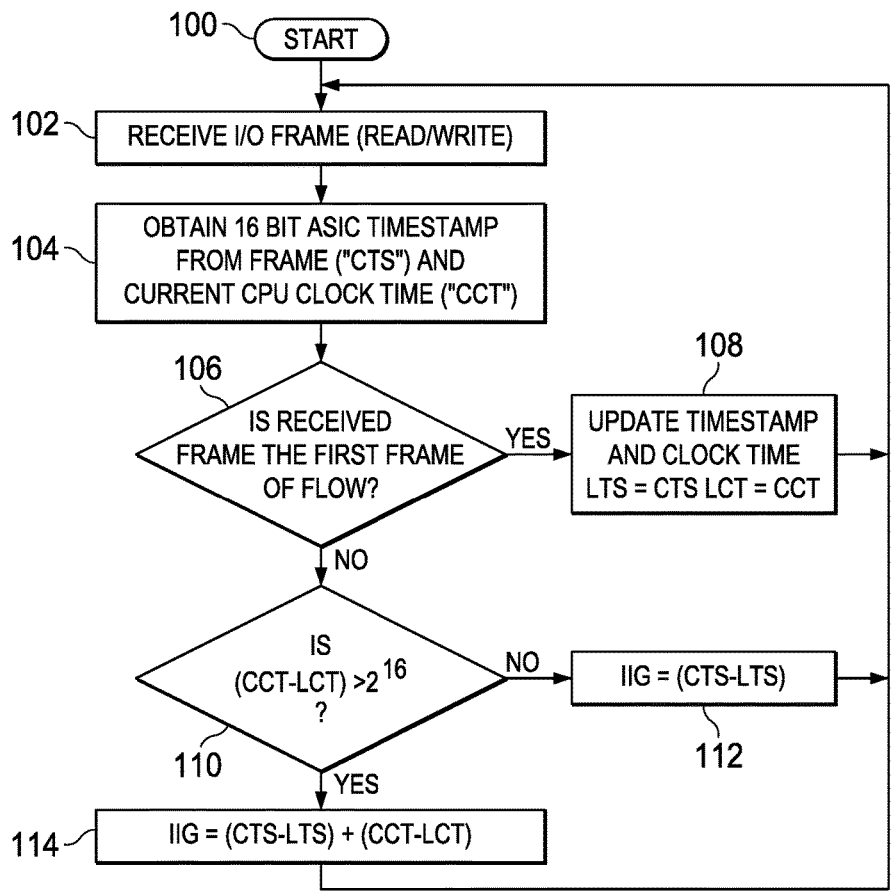
FIG. 6 is a simplified flow diagram illustrating calculation of IIG in accordance with embodiments described herein.

FIG. 6 is a flowchart illustrating a process for calculating IIG in accordance with embodiments described herein. The frames arriving at the network processor have a shim header (Vegas 2 header) that carries a 16-bit timestamp imposed by the ingress port of the ASIC. By measuring the timestamp delta between two successive READ operations for a given application flow (SID, DID, LUN) on an edge F-port, the IIG can be deduced. These values may be aggregated and a Min/Max/Avg IIG can be computed on a per flow basis, characterizing the READ burstiness of the flow. In addition, the flow record stores a 16-bit counter of the last seen READ timestamp. An I/O inactivity timer can be used on a per port basis (NPU can scale to millions of timers) to detect the 16-bit timestamp counter overflow condition. Referring to FIG. 6, an IIG calculation process begins in step 100. In step 102, a frame is received at the NPU. In step 104, the 16-bit timestamp of the frame is read (current time stamp or "CTS") and the current NPU clock time is obtained (current clock time or "CCT"). In step 106, a determination is made whether the received frame is the first frame of the flow. If a positive determination is made in step 106, execution proceeds to step 108, in which the last time stamp ("LTS") is updated to equal CTS and the last clock time ("LTS") is updated to equal CCT.

Upon completion of step 108, execution returns to step 102. If it is determined in step 106 that the received frame is not the first frame of the flow, execution proceeds to step 110, in which a determination is made whether (CCT−LCT)>$2^{16}$. Step 110 checks whether the 15-bit timestamp counter is overflowing. After the counter reaches $2^{16}$, it wraps back to 0. If this boundary condition exists, IIG needs to be calculated as the addition of two values, one towards the end of $2^{16}$ and the other toward the beginning from 0. If a negative determination is made in step 110, execution proceeds to step 112, in which IIG is calculated as (CTS−LTS). Upon completion of step 112, execution then proceeds to step 108. If a positive determination is made in step 110, execution proceeds to step 114, in which IIG is calculated as ((CTS−LTS)+(CCT−LCT)). In step 115, a determination is made whether the queue depth limit has been reached, based on the MPE (or queue depth fed from external means). If so, IIG calculation is suspended and execution remains at step 115 until a negative determination is made, at which point execution returns to step 102.

It will be noted that the process illustrated in FIG. 6 is based on an assumption that the ASIC clock and the NPU clock are operating at the same frequency. If that is not the case, an appropriate factor will need to be used to compensate for the differing frequencies.

Figure 7:
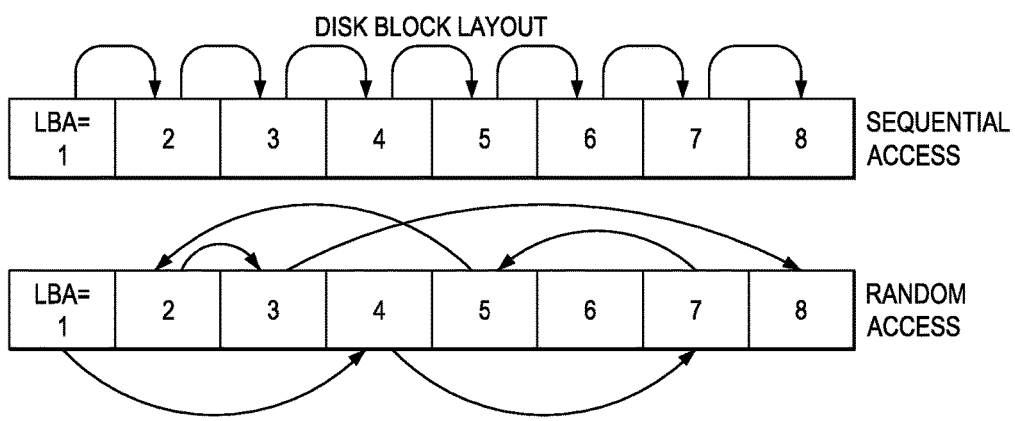
FIG. 7 is a simplified block diagram illustrating sequential block access versus random block access in accordance with embodiments described herein.

LUN IAP concerns access patterns such as sequential block access vs. random block access (as illustrated in FIG. 7), READ access vs. WRITE access, etc. Most modern storage arrays use several optimization techniques on data between the storage processor and the physical storage media. One common technique that is deployed in the case of sequential I/O streams is to coalesce a large number of smaller size (e.g., 8K) I/O requests into fewer large (e.g., 256K) I/O requests serviced by underlying physical storage. This results in better throughput, but higher latencies/ECTs. In the case of interleaved and sequential I/O access, the smaller sequential I/O requests are not coalesced, as the IAP as seen by storage processor is no longer purely sequential; therefore, while the latencies/ECTs are smaller in this case, throughput will be lower. As a result, mixing sequential I/O and random I/O into a single LUN can have unintended consequences, such as performance degradation of the sequential I/O. On the other hand, when storage consolidation is done by sharing a LUN across multiple applications with random I/Os, the benefits of statistical multiplexing can be reaped and overall utilization can be improved, ECT can be reduced, and bursts can be better absorbed. To summarize, given the optimization techniques on data storage and the type of IAP on a LUN, recommendations for consolidation of applications to LUNs and their placement across LUNs can be provided. The recommendations in terms of LUN movement can be put into effect immediately using less disruptive techniques like storage vMotion or more traditional ones, such as scheduling application downtime.

Measuring the READ and WRITE I/O patterns for an application can also provide valuable inputs that can help to choose which backed storage (i.e., LUN) is best suited for the application. A WRITE heavy application is better placed on a HDD due to the WRITE penalty associated with SSDs. The RAID type for the LUN with significant WRITE costs, such as RAID5 or RAID6, are also better avoided for them. READ patterns that arrive at a large fixed or random offset from previous READs is indicative of some sort of a stride pattern, which can be serviced reasonably efficiently by a HDD drive. WRITEs mostly in the forward direction indicate usage of some sort of caching and I/O scheduling on the server end and a low end non-cached storage array will likely serve the purpose just fine. WRITEs that are periodically bursty can be due to periodic flushing of buffers on the OS and SSD LUNs are better avoided for them.

Some application vendors do document the IAPs for their applications. For example, SQOL server has the following documented characteristics: DB index maintenance is random READ/WRITE; DB integrity check is large sequential READ; transaction log backup is sequential WRITE, etc. Not all application vendors provide this data. Moreover, measuring it in the SAN independently can present a true picture and can expose deviations of the application IAP indicative of application misbehavior. This information can be of immense value to a storage administrator.

Insights into live I/O workload patterns can also help the application administrator (such as a database administrator) map some of the application's routine activities to specific schedules in the environment. For example, a database integrity check of a LUN that is characterized by large sequential reads may be scheduled for a weekend time.

An algorithm for implementing LUN IAP is as follows. Every SCSI READ and WRITE operation has a 32-bit Logical Block Address ("LBA") location indicated in the SCSI header. LBA is a simple linear addressing scheme where blocks are located by an integer index, with the first block being LBA 0, the second LBA 1, and so on. The IAP can be determined in the NPU tracking the LBAs being accessed. A table of most recently accessed LBAs is maintained per flow (SID, DID, LUN) in the flow record data structure of the NPU and is updated in a circular fashion. The size of the table can be modelled per edge port based on the LUN Q depth settings deduced for the flows on the port. A continuously increasing LBA value for the flow indicates sequential access, while LBA values without a specific pattern indicates random access. It will be noted that, while this table method may be better at identifying a mix of sequential and random patterns, a simpler method (as described in greater detail below) would be to maintain the next expected LBA number as the previous LBA+1 to identify sequential access. SCSI READ and WRITE operations can be accounted for by looking up the SCSI CDB 1st byte in the SCSI header, which has different opcode for all different types of READ and WRITE.

Figure 8:
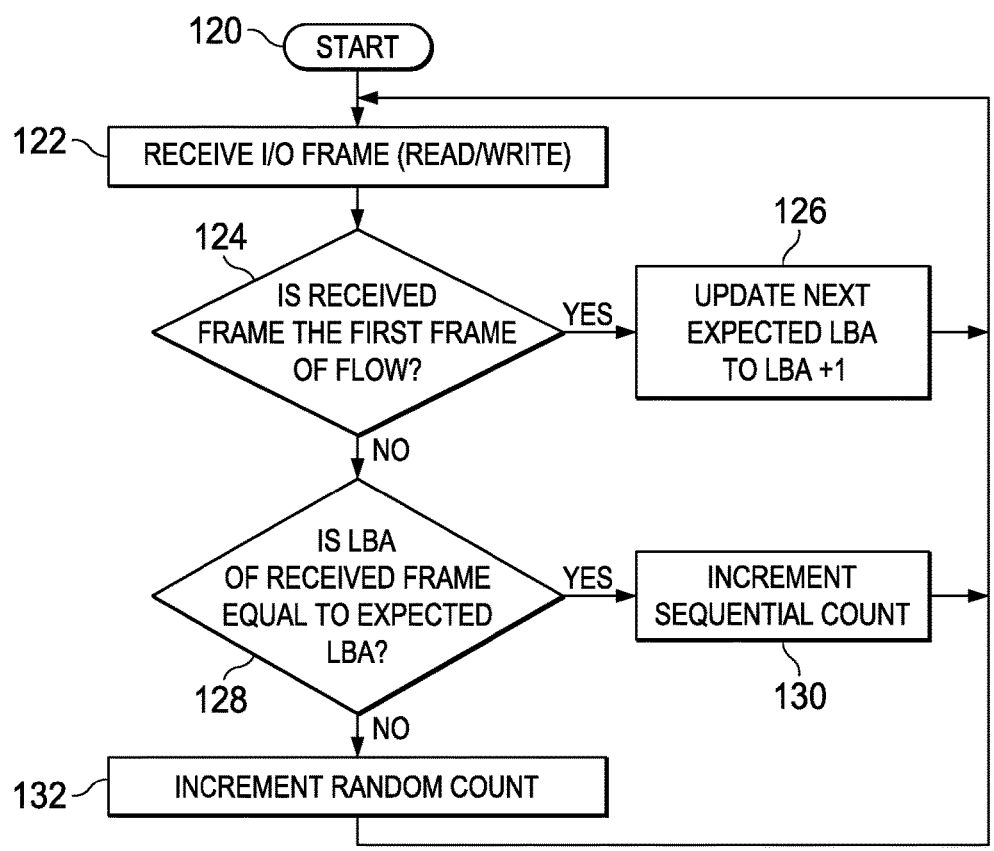
FIG. 8 is a simplified flow diagram illustrating calculation of access pattern in accordance with embodiments described herein.

FIG. 8 is a flow diagram of a process for calculating LUN access patterns in accordance with embodiments described herein. Execution begins in step 120. In step 122, a frame is received at the NPU. In step 124, a determination is made whether the received frame is the first frame of the flow. If a positive determination is made in step 124, execution proceeds to step 126, in which the next expected LBA is updated to be equal to current LBA+1. Upon completion of step 126, execution returns to step 122. If a negative determination is made in step 124, execution proceeds to step 128. In step 128, a determination is made whether the LBA of the received frame is equal to the Expected LBA. If a positive determination is made in step 128, execution proceeds to step 130, in which the access is determined to be sequential and a variable SCNT is increased by 1. Execution then proceeds to step 126. If a negative determination is made in step 128, execution proceeds to step 132, in which the access is determined to be random and a variable RCNT is increased by 1. Execution then proceeds to step 126.

At any time, a percentage of randomness for the flow can be calculated as RCNT/(RNCT+SCNT). A highly random access to a LUN on a disk can benefit from a disk defragmentation to obtain improved performance. Additionally, using a hash table of LBA ranges seen for a flow can indicate a pattern like a narrow range of LBA access done frequently. A caching mechanism at the storage area (usually an SSD-based cache), if enabled for the LUN, can have immense performance benefit.

I/O block size is the group of contiguous space used to manage data placement on disk. The storage LUNs are configured for a specific block size depending on physical media geometry. If the block sizes configured in the OS File System/Application are different from the volume (LUN) block size mounted to the File System, it can have detrimental effects on performance, especially for random READ I/Os. The SCSI layer of the storage stack in the OS will discover the block size of the LUN and always perform I/O operations to match the LUN block size. In case a mismatch is determined, techniques like caching and coalescing are employed to match the LUN block size. In contrast, for a completely random access pattern, these techniques may not come into play and every block storage operation will have to be flushed to the storage device, resulting in distinct I/O operations.

Figure 9A:
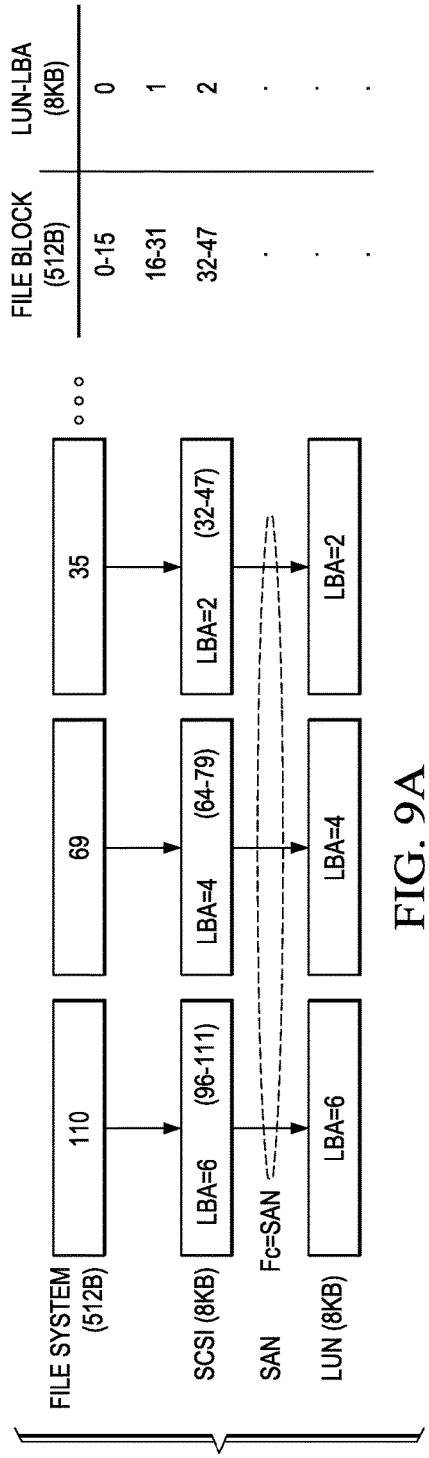
FIGS. 9A-9C are simplified block diagrams illustrating I/O block size versus LUN block size in accordance with embodiments described herein.

For example, if the File System is configured for a 512 B block size and the LUN to which it is mapped is configured for an 8 KB block size, an application performing a random 512 B block read would result in the block layer performing an 8 KB I/O operation, since that is the minimal addressable unit in the LUN. This could force the storage to read an 8 KB block of data and transport it in the network just to fetch the 512 B data. This type of READ I/O could occur millions of times a day for a normal application, resulting in the storage device being unnecessarily busy reading much more data from disk than necessary and the network unnecessarily busy transmitting it, and highly inefficient use of resources. Optimal block size tuning is usually the most overlooked parameter and tuning it can significantly improve the storage performance. The foregoing situation (i.e., I/O block size and LUN LBA size mismatch due to random block access) is illustrated in FIG. 9A It is also quite possible that a single application can be performing READs and WRITEs with different block sizes and mapped to the same LUN. It is important to measure the most commonly used block sizes of the application and then configure the LUN block size to match; thereby obtaining the maximum performance from the storage infrastructure. The READ/WRITE I/O size on a LUN should be compared against the configured LUN's block size to check if they are being used in an efficient manner. A significant number of small I/O operations on a LUN with a large block size may be red-flagged, along with a suggested LUN block size that would optimal for the application/flow.

Figure 9B:
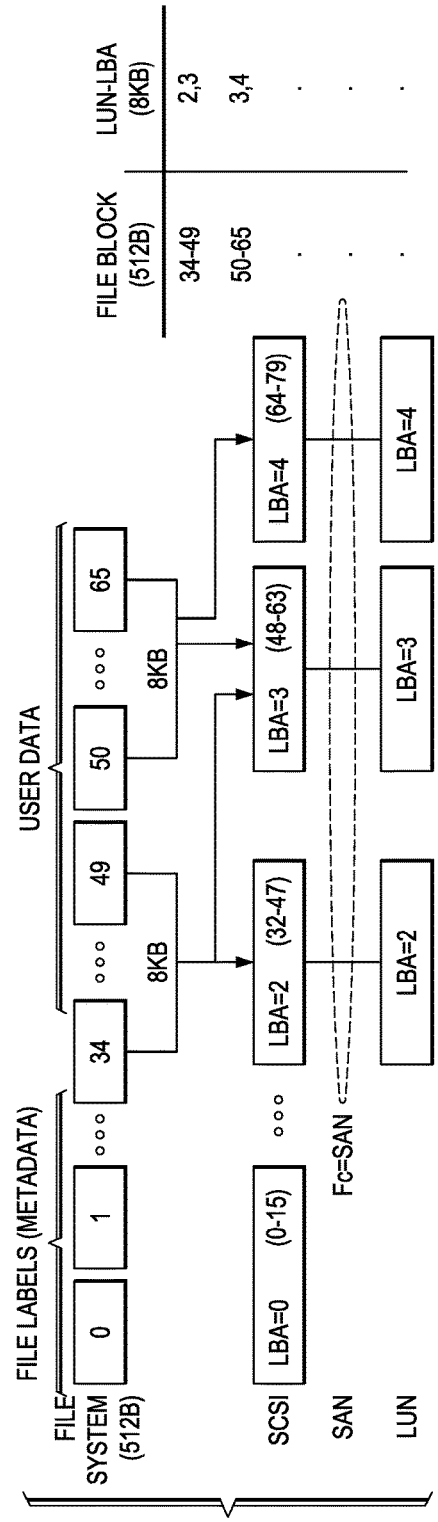

Another issue with regard to block sizes concerns misaligned LUN access when the LUNs are not correctly aligned with file system block boundaries. In cases of misaligned I/O, additional partial READs are required to complete an operation. These additional partial READs increase the I/O load on the storage system, as well as the latency experienced by the applications. For example, assuming the LUN is configured for an 8 KB block size and file system operates in 512 B blocks, and further assuming that user data of the file system begins from block 34. The SCSI layer of the storage stack discovers the LUN size as 8 KB and does the math for read of file system blocks 34-49. This requires the storage system to read two 8 KB allocation units (blocks 32-47 and 48-63). The ideal way would be to align the 512 B block of the file system to an 8 KB boundary by configuring the OS to leave enough empty space between end of disk label and first byte of user data to ensure that the first byte of user data is written to first byte of an allocation unit in the storage device. In the above example, the starting sector should be advanced to any multiple of 16 sectors beyond sector 48. The foregoing situation (i.e., I/O block and LUN LBA misalignment with sequential access) is illustrated in FIG. 9B.

Figure 9C:
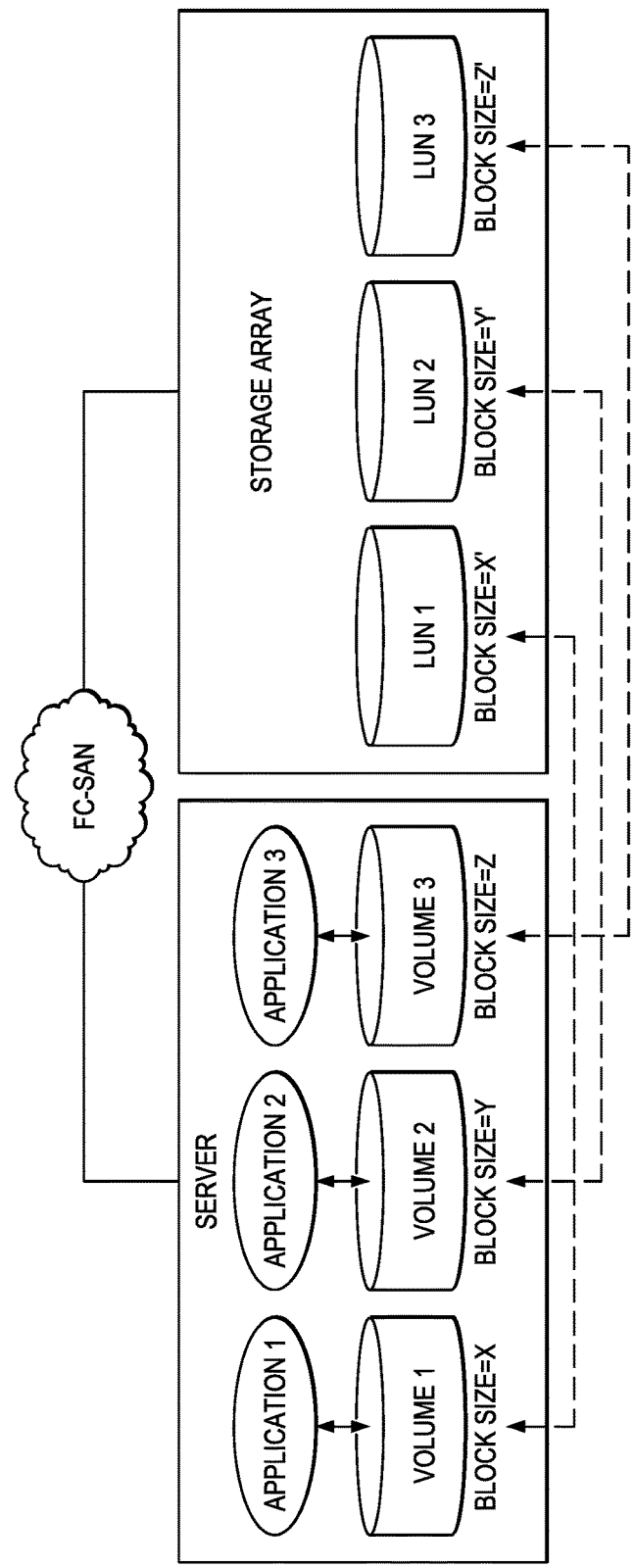

As illustrated in FIG. 9C, an application typically reserves a LUN for its volume and then issues a SCSI READ_CAPACITY command on the LUN. The block size of the LUN size can be determined from the SCSI READ_CAPACITY command, which indicates that value in bytes in a Sector (Block) Size field. Since the SCSI layer always matches the LUN block size, from the SAN network it is difficult to detect block size alignment mismatches. As a close estimate, the total I/O throughput as measured from the SCSI frames destined to a LUN as seen in the FC-SAN network can be compared against the throughput as measured in the file system or the block access layer of the OS (using tools like "iostat" or "dstat," for example). Significant mismatches in the throughput numbers (>50% difference) can be indicative of mismatched or misaligned LUN block access.

Figure 10A:
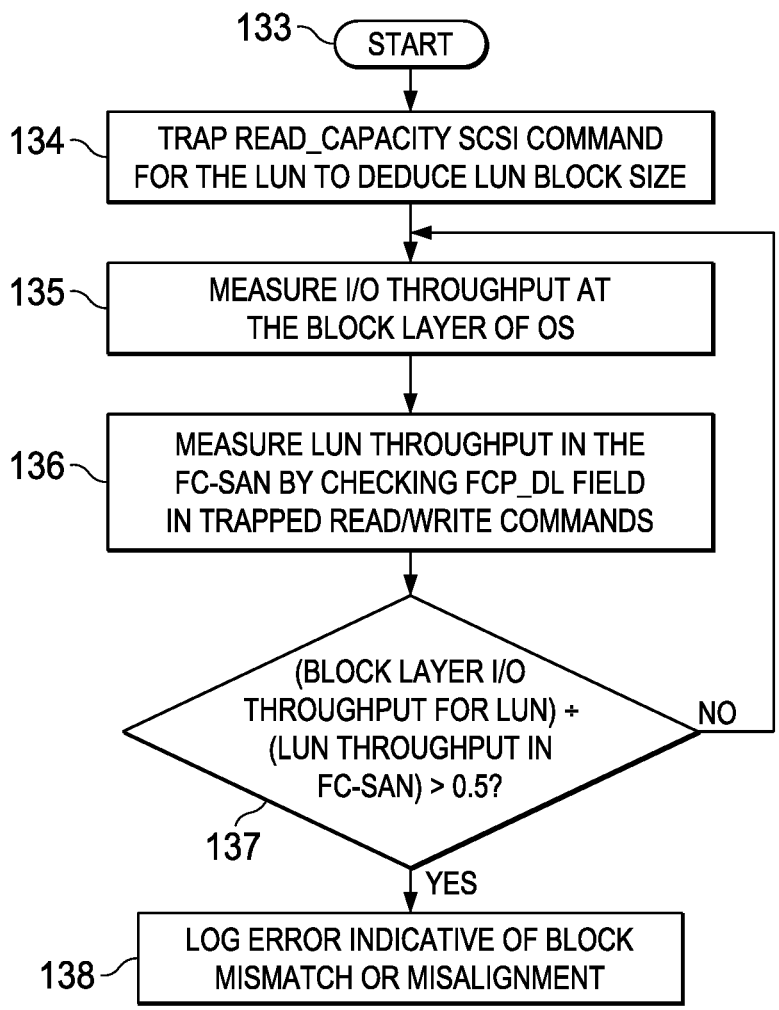
FIGS. 10A and 10B are simplified flow diagrams illustrating methods for determining an optimal LUN block size in accordance with embodiments described herein.

Referring now to FIG. 10A, illustrated therein is a flowchart illustrating a process for selecting optimal LUN block size based on I/O block size for an application/flow. Execution begins in step 133. In step 134, a READ_CAPACITY SCSI command for the LUN is trapped to deduce the LUN block size. In step 135, the I/O throughput at the block layer of the OS is measured for the LUN using tools such as iostat or dstat, for example. In step 136, the LUN throughput in the FC-SAN is measured by checking the FCP_DL field in the trapped READ/WRITE commands. In step 137, a determination is made whether the block layer throughput for the LUN divided by the LUN throughput in the FC-SAN is greater than 0.5 (i.e., whether the mismatch is 0.50%). If so, execution proceeds to step 138, in which an error indicative of block mismatch or misalignment is logged; otherwise, execution returns to step 135.

Figure 10B:
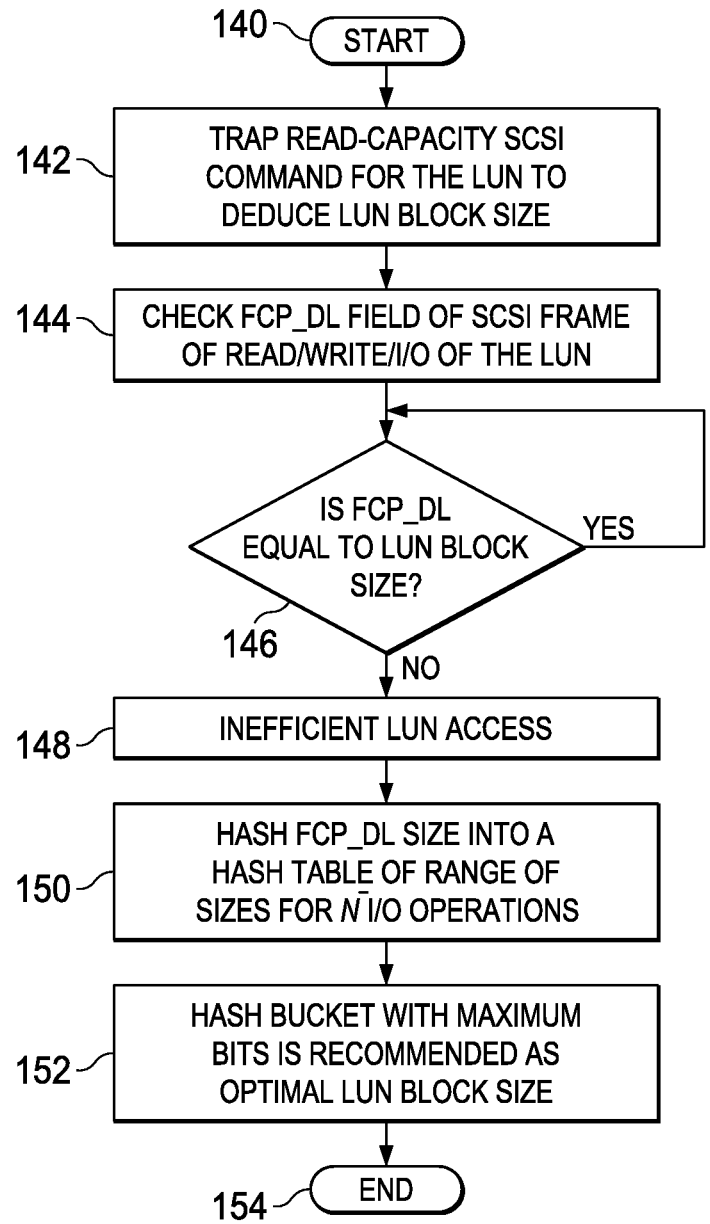

Some OSes, such as legacy Microsoft Windows servers, have a fixed block size configuration at a volume level. All the application doing I/O to the volume will be performing I/O operations of that block size. If the LUN mapped to this volume is not configured for the same block size on the storage array, inefficient access happens for every I/O operation. Such misconfiguration can be detected by the embodiments described above and one optimal LUN configuration can be advised. FIG. 10B is a flowchart illustrating an alternative process for selecting optimal LUN block size based on I/O block size for an application/flow in situations in which the OS has a fixed block size configuration at a volume level. The process starts in step 140. In step 142, the SCSI READ_CAPACITY command is trapped and the block size of the LUN is deduced therefrom. In step 144, the FCP_DL field of the SCSI frame of a READ/WRITE I/O on the LUN is checked. In step 146, a determination is made whether the FCP-DL field is equal to the LUN block size determined in step 142. If so, execution returns to step 144 to await the next READ/WRITE I/O frame; otherwise, execution proceeds to step 148. In step 148, it is determined that there is inefficient LUN access (i.e., that the LUN block size is non-optimal). In step 150, the FCP_DL sizes are hashed into a hash table of range of sizes. This step is repeated for the next N I/O operations. In step 152, the hash bucket with the maximum number of bits is recommended as the optimal LUN block size for the application. Execution terminates in step 154.

As previously noted, IOPS stands for Number of I/O operations per second. IOPS can be further classified as READ IOPS and WRITE IOPS. Application vendors usually provide formulas to determine an application's IOPS requirements depending on factors like the number of users of the application, the user profile of each user, database characteristics, etc. A minimum IOPS Service Level Agreement ("SLA") per application will be required to be maintained for healthy running of the application. While the IOPS requirement is usually the primary number to meet, it is possible to run up against throughput (bandwidth) limitations while still meeting the IOPS requirements with various types of storage subsystems. While IOPS is primarily concerned with random transactional performance, it ignores the sequential I/O portion of an application. For sequential access applications (e.g., databases), a minimum SAN and storage throughput SLA is of prime importance. The throughput SLA should be guaranteed at all times end-to-end by the storage device and the SAN in between. The application administrator should be notified of the possibility of IOPS and throughput SLAs being compromised so that necessary troubleshooting actions can begin before the application degradation begins.

Figure 11A:
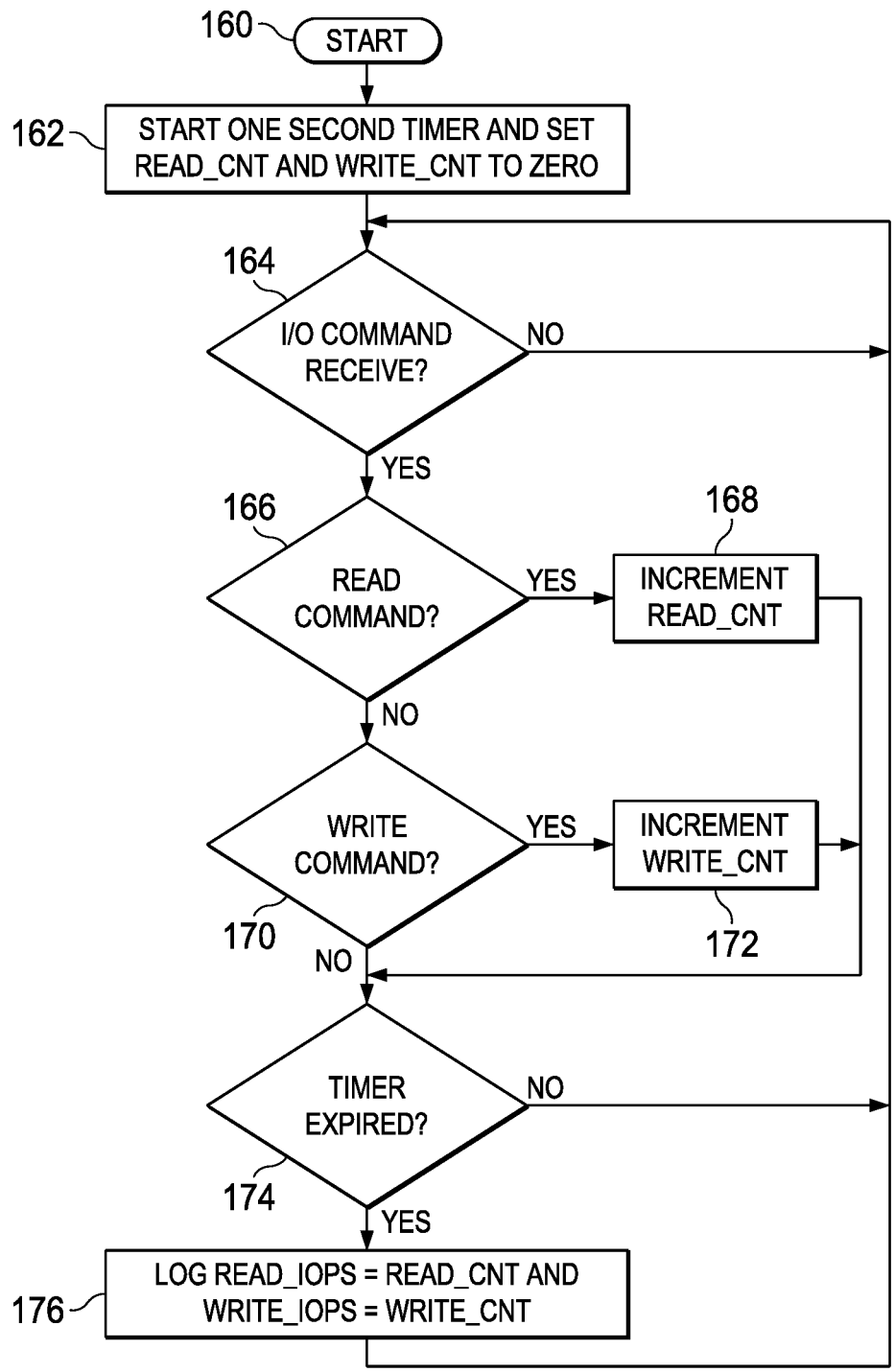
FIGS. 11A and 11B are simplified flow diagrams illustrating a method for determining IOPS and throughput in accordance with embodiments described herein.
Figure 11B:
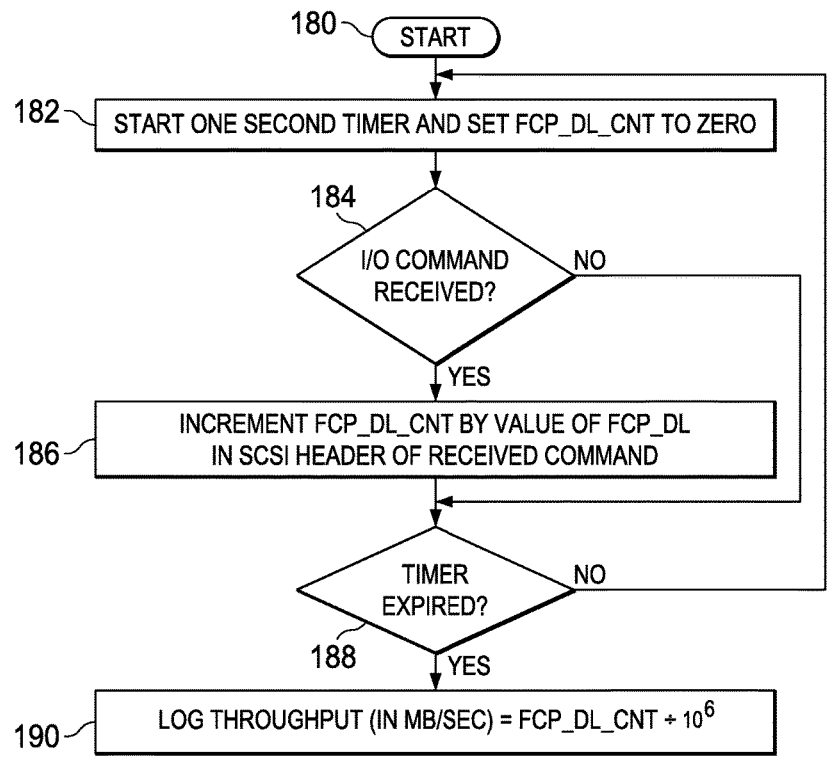

An algorithm for implementing IOPS and throughput is as follows. While IOPS per flow can be measured by counting the number of READ and WRITE SCSI commands seen per flow per second, throughput can be determined by using the FCP_DL field in the SCSI header separately for both READ and WRITE. FCP_DL indicates the number of bytes of data to read from the LBA offset of the LUN. By adding this number into a counter for all the flows, the rate of the flow can be measured in terms of MB/s, which is indicative of the application throughput. Note that the interface level throughput ("link utilization") already being computed today using switch interface counters is for the entire link and not for a specific application/flow. FIGS. 11A and 11B respectively illustrate flowcharts for calculating IOPS and throughput per flow for determining IOPS and throughput in accordance with embodiments described herein.

Referring to FIG. 11A, execution starts in step 160. In step 162, a one second timer is started and counters READ_CNT and WRITE_CNT are set to zero. In step 164, a determination is made whether an I/O command has been received. If not, execution remains at step 164; otherwise, execution proceeds to step 166. In step 166, a determination is made whether the received command is a READ command. If so, in step 168, counter READ_CNT is incremented by 1; if not, execution proceeds to step 170. In step 170, a determination is made whether the received command is a WRITE command. If so, in step 172, counter WRITE_CNT is incremented by 1. Upon completion of step 168 or step 172, or responsive to a negative determination in step 170, execution proceeds to step 174, in which a determination is made whether the one second timer has expired. If not, execution returns to step 162; otherwise, execution proceeds to step 176. In step 176, a variable READ_IOPS is set to equal the value of READ_CNT and a variable WRITE_IOPS is set to equal the value of WRITE_CNT. Execution then returns to step 162.

Referring to FIG. 11B, execution begins in step 180. In step 182, a one second timer is started and a counter FCP_CL_CNT is set to zero. In step 184, a determination is made whether an I/O command has been received. If so, execution proceeds to step 186, in which the value of FCP_DL_CNT is incremented by the value of FCP_CL in the SCSI header of the received command. Upon completion of step 186 or responsive to a negative determination in step 184, execution proceeds to step 188, in which a determination is made whether the one second timer has expired. If not, execution returns to step 182; otherwise, execution proceeds to step 190. In step 190, throughput (in MB/sec) is logged as the value of FCP_CL_CNT divided by 106.

IOPS per Virtual Server is much finer metric compared to IOPS and is computed on a per-VM basis. Virtualization creates a shared-everything platform of compute resources. While this works for most new age applications, traditional bare-metal server applications, such as databases that are migrated to a virtual platform, do not like the shared compute platform, as they are extremely sensitive to IO latencies. In such a scenario, one VM consuming all of the resources on a host can impact the other VMs on the same host. For example, if one SQL Server is periodically running a database integrity check (which is highly I/O intensive), the HBA adapter through which it is accessing the LUN could become quite active and busy. This can cause the physical HBA to reach its maximum throughput without leaving room for the other VMs to perform their normal duties. The other VMs I/O requests are backed up in the queues inside the hypervisor, and the application running on the VM can start seeing high I/O latencies. Tracking IOPS on a per VM basis therefore can provide valuable information about VM 10 activity. Using this information, the administrator can choose to migrate VMs to other servers that are lightly loaded. Additionally, per-VM QoS policies provided by the hypervisor (e.g., SIOC from VMware) or the storage controller can be applied so that the I/O of one VM can be prioritized over that of another.

Figure 12:
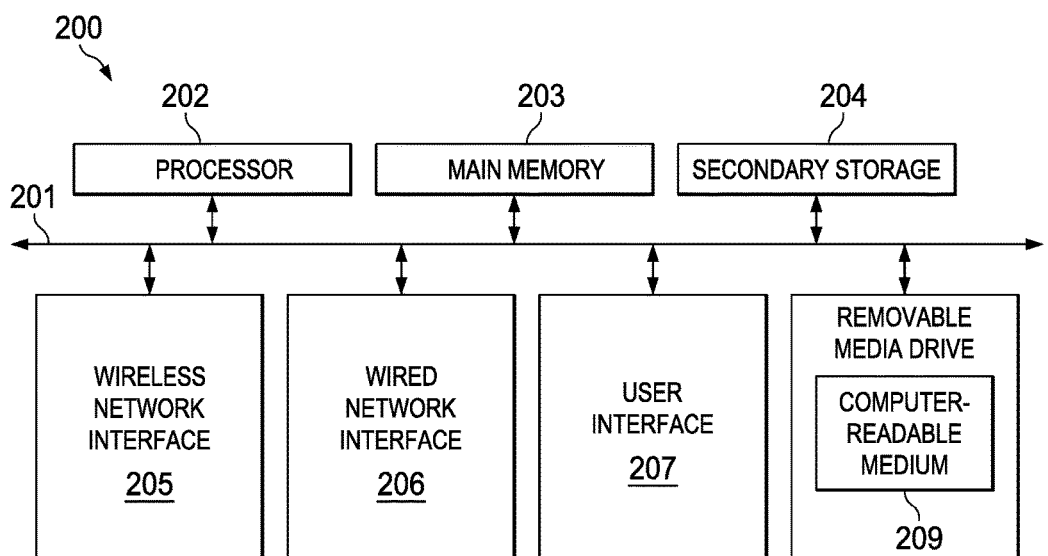
FIG. 12 is a simplified block diagram of a machine comprising an element of a communications network according to one or more examples of embodiments described herein.

Turning to FIG. 12, FIG. 12 illustrates a simplified block diagram of an example machine (or apparatus) 200, which in certain embodiments may be a server or a switch, that may be implemented in embodiments described herein. The example machine 200 corresponds to network elements and computing devices that may be deployed in a communications network. In particular, FIG. 12 illustrates a block diagram representation of an example form of a machine within which software and hardware cause machine 200 to perform any one or more of the activities or operations discussed herein. As shown in FIG. 12, machine 200 may include a processor 202, a main memory 203, secondary storage 204, a wireless network interface 205, a wired network interface 206, a user interface 207, and a removable media drive 208 including a computer-readable medium 209. A bus 201, such as a system bus and a memory bus, may provide electronic communication between processor 202 and the memory, drives, interfaces, and other components of machine 200.

Processor 202, which may also be referred to as a central processing unit ("CPU"), can include any general or special-purpose processor capable of executing machine readable instructions and performing operations on data as instructed by the machine-readable instructions. Main memory 203 may be directly accessible to processor 202 for accessing machine instructions and may be in the form of random access memory ("RAM") or any type of dynamic storage (e.g., dynamic random access memory ("DRAM")). Secondary storage 204 can be any non-volatile memory such as a hard disk, which is capable of storing electronic data including executable software files. Externally stored electronic data may be provided to computer 200 through one or more removable media drives 208, which may be configured to receive any type of external media such as compact discs ("CDs"), digital video discs ("DVDs"), flash drives, external hard drives, etc.

Wireless and wired network interfaces 205 and 206 can be provided to enable electronic communication between machine 200 and other machines, or nodes. In one example, wireless network interface 205 could include a wireless network controller ("WNIC") with suitable transmitting and receiving components, such as transceivers, for wirelessly communicating within a network. Wired network interface 206 can enable machine 200 to physically connect to a network by a wire line such as an Ethernet cable. Both wireless and wired network interfaces 205 and 206 may be configured to facilitate communications using suitable communication protocols such as, for example, Internet Protocol Suite ("TCP/IP"). Machine 200 is shown with both wireless and wired network interfaces 205 and 206 for illustrative purposes only. While one or more wireless and hardwire interfaces may be provided in machine 200, or externally connected to machine 200, only one connection option is needed to enable connection of machine 200 to a network.

A user interface 207 may be provided in some machines to allow a user to interact with the machine 200. User interface 207 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 208 represents a drive configured to receive any type of external computer-readable media (e.g., computer-readable medium 209). Instructions embodying the activities or functions described herein may be stored on one or more external computer-readable media. Additionally, such instructions may also, or alternatively, reside at least partially within a memory element (e.g., in main memory 203 or cache memory of processor 202) of machine 200 during execution, or within a non-volatile memory element (e.g., secondary storage 204) of machine 200. Accordingly, other memory elements of machine 200 also constitute computer-readable media. Thus, "computer-readable medium" is meant to include any medium that is capable of storing instructions for execution by machine 200 that cause the machine to perform any one or more of the activities disclosed herein.

Not shown in FIG. 12 is additional hardware that may be suitably coupled to processor 202 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 200 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 200 to appropriately manage the operation of the hardware components therein.

The elements, shown and/or described with reference to machine 200, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 203, secondary storage 204, computer-readable medium 209) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 202) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    monitoring by an integrated circuit device READ/WRITE commands in connection with a flow of an application executing in a Fibre Channel Storage Area Network ("FC-SAN");
    determining from the monitored READ/WRITE commands a Logical Unit Number ("LUN") I/O access pattern ("IAP"), comprising:
        determining an LBA identified in a first I/O command;
        determining an LBA identified in an immediately subsequent I/O command;
        designating the LUN IAP as sequential if the LBA identified in the first I/O command is one less than the LBA identified in the immediately subsequent I/O command; and
        designating the LUN IAP as random if the LBA identified in the first I/O command is not one less than the LBA identified in the immediately subsequent I/O access;
    storing the calculated at least one metric in a flow record associated with the flow; and
    using the calculated at least one metric to identify a storage device for use by the flow;
    wherein the calculated at least one metric is indicative of a performance of the application in the FC-SAN.

2. The method of claim 1, wherein the at least one metric includes an inter I/O gap ("IIG"), and determining the IIG comprises:
    detecting timestamps associated with immediately successive READ/WRITE commands; and
    determining a time difference between the detected timestamps;
    wherein the determined time difference comprises an interim IIG for the immediately successive READ/WRITE commands.

3. The method of claim 2, wherein the determining the IIG further comprises:
    repeating the detecting and determining for a plurality of immediately successive READ/WRITE commands of the flow to determine a plurality of interim IIGs; and
    determining from the plurality of interim IIGs at least one of a maximum IIG, a minimum IIG, and an average IIG for the flow.

4. The method of claim 1, wherein the at least one metric includes a relative block size, and determining relative block size comprises:
    determining a LUN block size from a field in a response to a SCSI command issued by the application;
    determining a total number of I/O bytes indicated in a data length field of an I/O command issued by the application;
    comparing the LUN block size with the number of bytes to determine whether a mismatch exists between the LUN block size and the number of bytes.

5. The method of claim 1, wherein the at least one metric includes I/O operations per second ("IOPS") and throughput, and determining IOPS and throughput comprises at least one of:
    tracking a number of READ operations performed per second;
    tracking a number of WRITE operations performed per second; and
    tracking an amount of data read from the storage device per second; and
    tracking an amount of data written to the storage device per second.

6. The method of claim 1, wherein the at least one metric includes IOPS per virtual server, and determining IOPS per virtual server comprises:
    tracking a number of READ operations performed per second with respect to a first virtual server;
    tracking a number of WRITE operations performed per second with respect to the first virtual server.

7. The method of claim 1, wherein the integrated circuit device comprises a network processing unit ("NPU") disposed in an FC switch.

8. One or more non-transitory tangible media that includes code for execution and when executed by a processor is operable to perform operations comprising:
    monitoring by an integrated circuit device READ/WRITE commands in connection with a flow of an application executing in a Fibre Channel Storage Area Network ("FC-SAN");
    determining from the monitored READ/WRITE commands a Logical Unit Number ("LUN") I/O access pattern ("IAP"), comprising:

determining an LBA identified in a first I/O command;
determining an LBA identified in an immediately subsequent I/O command;
designating the LUN IAP as sequential if the LBA identified in the first I/O command is one less than the LBA identified in the immediately subsequent I/O command; and
designating the LUN IAP as random if the LBA identified in the first I/O command is not one less than the LBA identified in the immediately subsequent I/O access;
storing the calculated at least one metric in a flow record associated with the flow; and
using the calculated at least one metric to identify a storage device for use by the flow;
wherein the calculated at least one metric is indicative of a performance of the application in the FC-SAN.

9. The apparatus of claim 8, wherein the at least one metric includes an inter I/O gap ("IIG"), and determining the IIG comprises:
detecting timestamps associated with immediately successive READ/WRITE commands; and
determining a time difference between the detected timestamps, wherein the determined time difference comprises an interim IIG for the immediately successive READ/WRITE commands;
repeating the detecting and determining for a plurality of immediately successive READ/WRITE commands of the flow to determine a plurality of interim IIGs; and
determining from the plurality of interim IIGs at least one of a maximum IIG, a minimum IIG, and an average IIG for the flow.

10. The apparatus of claim 8, wherein the at least one metric includes a relative block size, and determining relative block size comprises:
determining a LUN block size from a field in a response to a SCSI command issued by the application;
determining a total number of I/O bytes indicated in a data length field of an I/O command issued by the application;
comparing the LUN block size with the number of bytes to determine whether a mismatch exists between the LUN block size and the number of bytes.

11. The apparatus of claim 8, wherein the at least one metric includes I/O operations per second ("IOPS") and throughput, and determining IOPS and throughput comprises at least one of:
tracking a number of READ operations performed per second;
tracking a number of WRITE operations performed per second; and
tracking an amount of data read from the storage device per second; and
tracking an amount of data written to the storage device per second.

12. The apparatus of claim 8, wherein the at least one metric includes IOPS per virtual server, and determining IOPS per virtual server comprises:
tracking a number of READ operations performed per second with respect to a first virtual server;
tracking a number of WRITE operations performed per second with respect to the first virtual server.

13. An apparatus comprising:
a memory element configured to store data; and
a processor operable to execute instructions associated with the data;
the apparatus configured for:
monitoring by an integrated circuit device READ/WRITE commands in connection with a flow of an application executing in a Fibre Channel Storage Area Network ("FC-SAN");
determining from the monitored READ/WRITE commands a Logical Unit Number ("LUN") I/O access pattern ("IAP"), comprising:
determining an LBA identified in a first I/O command;
determining an LBA identified in an immediately subsequent I/O command;
designating the LUN IAP as sequential if the LBA identified in the first I/O command is one less than the LBA identified in the immediately subsequent I/O command; and
designating the LUN IAP as random if the LBA identified in the first I/O command is not one less than the LBA identified in the immediately subsequent I/O access;
storing the calculated at least one metric in a flow record associated with the flow; and
using the calculated at least one metric to identify a storage device for use by the flow;
wherein the calculated at least one metric is indicative of a performance of the application in the FC-SAN.

14. The apparatus of claim 13, wherein the at least one metric includes an inter I/O gap ("IIG"), and determining the IIG comprises:
detecting timestamps associated with immediately successive READ/WRITE commands; and
determining a time difference between the detected timestamps, wherein the determined time difference comprises an interim IIG for the immediately successive READ/WRITE commands;
repeating the detecting and determining for a plurality of immediately successive READ/WRITE commands of the flow to determine a plurality of interim IIGs; and
determining from the plurality of interim IIGs at least one of a maximum IIG, a minimum IIG, and an average IIG for the flow.

15. The apparatus of claim 13, wherein the determining the LUN IAP further comprises:
determining an LBA identified in a first I/O command;
determining an LBA identified in an immediately subsequent I/O command;
designating the LUN LAP as sequential lithe LBA identified in the first I/O command is one less than the LBA identified in the immediately subsequent I/O command; and
designating the LUN IAP as random if the LBA identified in the first I/O command is not one less than the LBA identified in the immediately subsequent I/O access.

16. The apparatus of claim 13, wherein the at least one metric includes a relative block size, and determining relative block size comprises:
determining a LUN block size from a field in a response to a SCSI command issued by the application;
determining a total number of I/O bytes indicated in a data length field of an I/O command issued by the application;
comparing the LUN block size with the number of bytes to determine whether a mismatch exists between the LUN block size and the number of bytes.

17. The apparatus of claim 13, wherein the at least one metric includes I/O operations per second ("IOPS") and throughput, and determining IOPS and throughput comprises at least one of:

tracking a number of READ operations performed per second;

tracking a number of WRITE operations performed per second; and tracking an amount of data read from the storage device per second; and tracking an amount of data written to the storage device per second.

18. The apparatus of claim 13, wherein the at least one metric includes IOPS per virtual server, and determining IOPS per virtual server comprises:

tracking a number of READ operations performed per second with respect to a first virtual server;

tracking a number of WRITE operations performed per second with respect to the first virtual server.

* * * * *